(12) United States Patent
Ueda et al.

(10) Patent No.: US 9,165,330 B2
(45) Date of Patent: Oct. 20, 2015

(54) MANAGEMENT SYSTEM OF MINING MACHINE AND MANAGEMENT METHOD OF MINING MACHINE

(75) Inventors: Takahiro Ueda, Maebashi (JP);
Koutarou Hori, Sagamihara (JP);
Tadashi Taninaga, Fujisawa (JP);
Hisataka Fukasu, Fujisawa (JP);
Takashi Itoi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/825,102

(22) PCT Filed: Sep. 12, 2012

(86) PCT No.: PCT/JP2012/073370
§ 371 (c)(1),
(2), (4) Date: May 29, 2013

(87) PCT Pub. No.: WO2013/069370
PCT Pub. Date: May 16, 2013

(65) Prior Publication Data
US 2014/0244098 A1  Aug. 28, 2014

(30) Foreign Application Priority Data

Nov. 11, 2011  (JP) .................. 2011-248058

(51) Int. Cl.
*G01M 17/00* (2006.01)
*G06F 7/00* (2006.01)
*G06F 11/30* (2006.01)
*G06F 19/00* (2011.01)
(Continued)

(52) U.S. Cl.
CPC ..................... *G06Q 50/02* (2013.01)

(58) Field of Classification Search
USPC ..................................................... 701/23–28
See application file for complete search history.

(56) References Cited

U.S. PATENT DOCUMENTS 6,484,078 B1 * 11/2002 Kageyama ................. 701/25
6,988,591 B2 * 1/2006 Uranaka et al. ............ 187/247
(Continued)

FOREIGN PATENT DOCUMENTS

CN    101023458 A    8/2007
CN  1 01 821 600       9/2010
(Continued)

OTHER PUBLICATIONS

Choi, Y. et al., "Multi-criteria evaluation and least-cost path analysis for optimal haulage routing of dump trucks in large scale open-pit mines," International Journal of Geographical Information Science, 2009, vol. 23, No. 12, pp. 1541-1567.
(Continued)

*Primary Examiner* — Thomas Tarcza
*Assistant Examiner* — Timothy Nesley
(74) *Attorney, Agent, or Firm* — Locke Lord LLP

(57) ABSTRACT

In a management system of the mining machine, a management device collects operation information about the dump truck via a management-side wireless communication device. Routes along which the dump truck travels are identified based on position information, included in the operation information about the dump truck, about at least four locations included in a route along which the dump truck moves to a location where the dump truck unloads a load, to a location where the dump truck loads a load, and to a location where the dump truck unloads the load again.

48 Claims, 21 Drawing Sheets

(51) Int. Cl.
*G07C 5/00* (2006.01)
*G06Q 50/02* (2012.01)

(56) References Cited

U.S. PATENT DOCUMENTS

| | | | |
|---|---|---|---|
| 7,822,680 B1 | 10/2010 | Weber et al. | |
| 8,014,294 B2 * | 9/2011 | Sun | 370/241 |
| 8,014,924 B2 * | 9/2011 | Greiner et al. | 701/50 |
| 8,275,678 B2 * | 9/2012 | Roberts et al. | 705/29 |
| 8,862,390 B2 * | 10/2014 | Sugawara et al. | 701/431 |
| 2008/0071470 A1 | 3/2008 | Hasegawa et al. | |
| 2009/0099707 A1 | 4/2009 | Greiner et al. | |
| 2010/0191415 A1 | 7/2010 | Hara | |

FOREIGN PATENT DOCUMENTS

| | | |
|---|---|---|
| CN | 102169341 A | 8/2011 |
| JP | 2002-115270 A | 4/2002 |
| JP | 2002-324294 A | 11/2002 |
| JP | 2003-178396 A | 6/2003 |
| JP | 2004-102322 A | 4/2004 |
| JP | 2006-172109 A | 6/2006 |
| JP | 2009-68239 A | 4/2009 |
| JP | 2009-134396 A | 6/2009 |
| JP | 2010-244247 A | 10/2010 |
| JP | 2011-500991 A | 1/2011 |
| JP | 4677119 B2 | 4/2011 |
| JP | 2011-118563 A | 6/2011 |

OTHER PUBLICATIONS

International Search Report dated Dec. 11, 2012, issued for PCT/JP2012/073370 and English translation thereof.
Written Opinion mailed Dec. 11, 2012, issued for PCT/JP2012/073370.

* cited by examiner

| TIME | POSITION INFORMATION | VEHICLE SPEED | TRAVEL DISTANCE | TOTAL TRAVEL DISTANCE |
|---|---|---|---|---|
| t1 | P1(X1,Y1,Z1) | V1 | $L1 = \Delta t \times V1$ | $Ls = L1$ |
| t2 | P2(X2,Y2,Z2) | V2 | $L2 = \Delta t \times V2$ | $Ls = L1 + L2$ |
| ⋮ | ⋮ | ⋮ | ⋮ | ⋮ |
| ti | Pi(Xi,Yi,Zi) | Vi | $Li = \Delta t \times Vi$ | $Ls = L1 + L2 + \cdots Li$ |
| ⋮ | ⋮ | ⋮ | ⋮ | ⋮ |
| tn | Pn(Xn,Yn,Zn) | Vn | $Vn = \Delta t \times Vn$ | $Ls = \sum_{i=1}^{n} Li$ |

FIG.21

| TIME | POSITION IN-FORMATION | VEHICLE SPEED | FUEL CON-SUMPTION | ... | REGION ID |
|---|---|---|---|---|---|
| t1 | P1 | V1 | FC1 | ... | Ia |
| t2 | P2 | V2 | FC2 | ... | Ia |
| ⋮ | ⋮ | ⋮ | ⋮ | ⋮ | ⋮ |
| t25 | P25 | V25 | FC25 | ... | Ic |
| t26 | P26 | V26 | FC26 | ... | Ic |
| ⋮ | ⋮ | ⋮ | ⋮ | ⋮ | ⋮ |
| t108 | P108 | V108 | FC108 | ... | If |
| t109 | P109 | V109 | FC109 | ... | If |
| ⋮ | ⋮ | ⋮ | ⋮ | ⋮ | ⋮ |

| DUMP | DRIVER | ROUTE ALONG WHICH DUMP TRUCK IS DRIVEN IN CYCLE | | | |
|---|---|---|---|---|---|
| 20A | A | R1 | R2 | | |
| | B | R1 | R2 | R3 | |
| 20B | C | R1 | | | |
| | A | | | R3 | |
| 20C | D | R1 | | R3 | |
| | E | | | | R4 |

MANAGEMENT SYSTEM OF MINING MACHINE AND MANAGEMENT METHOD OF MINING MACHINE

FIELD

The present invention relates to a system and a method for managing a mining machine.

BACKGROUND

Various construction machines such as an excavator, a dump truck, and the like operate at a construction site or a mine quarry site. In recent years, operation information about a construction machine is obtained by wireless communication, and the state of the construction machine is grasped. For example, Patent Literature 1 describes a technique using GPS (Global Positioning System) information to automatically collect a cycle time record of a transport vehicle based on only matching of a loading spot and an unloading spot, thereby calculating vehicle dispatch plan thereafter.

CITATION LIST

Patent Literature

Patent Literature 1: Japanese Patent Laid-open No. 2010-244247

SUMMARY

Technical Problem

Patent Literature 1 is for the purpose of the vehicle dispatch plan, and only the loading spot and the unloading spot are evaluated. However, when it is the purpose to perform runway design evaluation or driver's driving education for improving productivity, it is necessary to analyze each travel route, and evaluation of only the loading spot and the unloading spot is insufficient.

An object of the present invention is to distinguish and identify the route along which a mining machine travels in a mine. It is also an object of the present invention to perform productivity evaluation of a mining machine and driver's driving education of a mining machine.

Solution to Problem

According to the present invention, a management system of a mining machine comprises: an in-vehicle information collection device which is provided in a mining machine working in a mine and collects operation information about an operation state of the mining machine; an in-vehicle wireless communication device provided in the mining machine to perform communication; a management-side wireless communication device which communicates with the in-vehicle wireless communication device; and a management device which collects the operation information via the in-vehicle wireless communication device and the management-side wireless communication device, wherein the management device identifies a route along which the mining machine travels, based on position information, included in the operation information, about at least four locations included in a route along which the mining machine moves from a location where the mining machine unloads a load, to a location where the mining machine loads a load, and to a location where the mining machine unloads the load again.

According to the present invention, a management system of a mining machine comprises: an in-vehicle information collection device which is provided in a mining machine working in a mine and collects operation information about an operation state of the mining machine; and an in-vehicle wireless communication device provided in the mining machine to perform communication, wherein the in-vehicle information collection device identifies a route along which the mining machine travels, based on position information, included in the operation information, about at least four locations included in a route along which the mining machine moves from a location where the mining machine unloads a load, to a location where the mining machine loads a load, and to a location where the mining machine unloads the load again, and position information about a designated route set in advance, and wherein the in-vehicle wireless communication device transmits the identified route along which the mining machine travels to the management device.

In the present invention, it is preferable that the route along which the mining machine travels is identified based on position information at a dumping position, position information about a loading position, and position information at two locations between the dumping position and the loading position.

In the present invention, it is preferable that when the route along which the mining machine travels is identified, numerical values of position information at multiple locations included in the route are rounded.

In the present invention, it is preferable that the management system of the mining machine further comprises a management-side storage device which stores the identified route along which the mining machine travels from which the operation information is collected and the operation information collected in association with each other.

In the present invention, it is preferable that when the operation information is analyzed, the management device extracts road surface information about a bump on a road surface from the operation information about a plurality of the mining machines travelling the same identified route to generate an index concerning maintenance of the road surface based on the extracted road surface information.

In the present invention, it is preferable that when the operation information is analyzed, the management device extracts fuel consumption information about fuel consumption during travel from the operation information about a plurality of the mining machines travelling the same identified route to generate an index concerning the fuel consumption based on the extracted fuel consumption information.

In the present invention, it is preferable that when the operation information is analyzed, the management device extracts a travel time and a stop time from the operation information about a plurality of the mining machines travelling the same identified route to generate an index concerning improvement of a travel speed of the mining machine, based on the travel time and the stop time extracted.

In the present invention, it is preferable that when the operation information is analyzed, the management device extracts long-time stop information about stop for a predetermined time or more and abnormality information about abnormality of the plurality of mining machines, from the operation information about a plurality of the mining machines travelling the route corresponding to the index concerning improvement of the travel speed to generate an index about inspection of the mining machine, based on the long-time stop information and the abnormality information extracted.

In the present invention, it is preferable that when the operation information is analyzed, the management device further extracts long-time stop position information about a position where stop for the predetermined time or more occurs, from the operation information about the mining machine travelling the route corresponding to the index concerning improvement of the travel speed to generate a route change index about change of a route of the mining machine or a fatigue check index about an attendance state of a driver of the mining machine, based on the long-time stop information and the long-time stop position information extracted.

In the present invention, it is preferable that when the operation information is analyzed, the management device extracts payload amount information about an amount of payload of a load loaded by the plurality of the mining machines from the operation information about the plurality of mining machines travelling the same identified route to generate a payload improvement request index requesting improvement of insufficient payload or improvement of over-payload, based on the payload amount information extracted.

In the present invention, it is preferable that when the operation information is analyzed, the management device extracts a payload amount information about the amount of payload of a load loaded by the plurality of mining machines, fuel consumption information about fuel consumption during travel, and cycle time information about a time required to finish unloading, load a load, and unload the load, from the operation information about the plurality of mining machines travelling the same identified route to generate a driving education index requesting improvement of driving of a driver who drives the mining machine, based on the payload amount information, the fuel consumption information, and the cycle time information extracted.

In the present invention, it is preferable that the management device divides the identified route into a plurality of sections in accordance with a slope of the identified route, and analyzes the operation information about the plurality of mining machines travelling the same identified route, for each of the divided sections.

According to the present invention, a management method of a mining machine comprises: a procedure for obtaining operation information about a mining machine working in a mine; and a procedure for identifying a route along which the mining machine travels, based on position information, included in the operation information, about at least four locations included in a route along which the mining machine moves from a location where the mining machine unloads a load, to a location where the mining machine loads a load, and to a location where the mining machine unloads the load again.

In the present invention, it is preferable that the route along which the mining machine travels is identified based on position information at a dumping position, position information about a loading position, and position information at two locations between the dumping position and the loading position.

In the present invention, it is preferable that when the route along which the mining machine travels is identified, numerical values of position information at multiple locations included in the route are rounded.

In the present invention, it is preferable that the management method of the mining machine further comprises a management-side storage device which stores the identified route along which the mining machine travels from which the operation information is collected and the operation information collected in association with each other.

In the present invention, it is preferable that after the route is identified, the management method includes: a procedure for extracting road surface information about a bump on a road surface from the operation information about a plurality of the mining machines travelling the same identified route, and a procedure for generating an index concerning maintenance of the road surface based on the extracted road surface information.

In the present invention, it is preferable that after the route is identified, the management method includes: a procedure for extracting fuel consumption information about fuel consumption during travel from the operation information about a plurality of the mining machines travelling the same identified route, and a procedure for generating an index concerning the fuel consumption based on the extracted fuel consumption information.

In the present invention, it is preferable that after the route is identified, the management method includes: a procedure for extracting a travel time and a stop time from the operation information about a plurality of the mining machines travelling the same identified route, and a procedure for generating an index concerning improvement of a travel speed of the mining machine, based on the travel time and the stop time extracted.

In the present invention, it is preferable that after the route is identified, the management method includes: a procedure for extracting long-time stop information about stop for a predetermined time or more and abnormality information about abnormality of the plurality of mining machines, from the operation information about a plurality of the mining machines travelling the route corresponding to the index concerning improvement of the travel speed, and a procedure for generating an index about inspection of the mining machine, based on the long-time stop information and the abnormality information extracted.

In the present invention, it is preferable that after the route is identified, the management method includes: a procedure for further extracting long-time stop position information about a position where stop for the predetermined time or more occurs, from the operation information about the mining machine travelling the route corresponding to the index concerning improvement of the travel speed, and a procedure for generating a route change index about change of a route of the mining machine or a fatigue check index about an attendance state of a driver of the mining machine, based on the long-time stop information and the long-time stop position information extracted.

In the present invention, it is preferable that after the route is identified, the management method includes: a procedure for extracting payload amount information about an amount of payload of a load loaded by the plurality of mining machines from the operation information about the plurality of mining machines travelling the same identified route, and a procedure for generating a payload improvement request index requesting improvement of insufficient payload or improvement of over-payload, based on the payload amount information extracted.

In the present invention, it is preferable that after the route is identified, the management method includes: a procedure for extracting a payload amount information about the amount of payload of a load loaded by the plurality of mining machines, fuel consumption information about fuel consumption during travel, and cycle time information about a time required to finish unloading, load a load, and unload the load, from the operation information about the plurality of mining machines travelling the same identified route, and a procedure for generating a driving education index requesting improvement of driving of a driver who drives the mining machine, based on the payload amount information, the fuel consumption information, and the cycle time information thus extracted.

In the present invention, it is preferable that after the route is identified, the management method includes: dividing the identified route into a plurality of sections in accordance with a slope of the identified route, and analyzing the operation information about the plurality of mining machines travelling the same identified route, for each of the divided sections.

In the present invention, it is possible to distinguish and identify the route along which a mining machine travels in a mine. In the present invention, productivity evaluation of a mining machine and driver's driving education of a mining machine can be performed.

BRIEF DESCRIPTION OF DRAWINGS

FIG. 10 is a chart illustrating relationship of position information, travel distance, and the like.

FIG. 11 is a flowchart illustrating a procedure of processing for identifying comparison target position.

FIG. 21 is a chart illustrating relationship of region ID, position information, and the like.

DESCRIPTION OF EMBODIMENTS

Mode for carrying out the present invention (embodiment) will be hereinafter explained in detail with reference to drawings. The present invention is not limited by the contents described in the embodiment below. The constituent elements described below include those that can be easily conceived of by a person skilled in the art and those which are substantially the same as the constituent elements. Further, constituent elements described below may be combined as necessary. The constituent elements can be omitted, replaced, or changed in various manners without deviating from the gist of the present invention.

Figure 1:
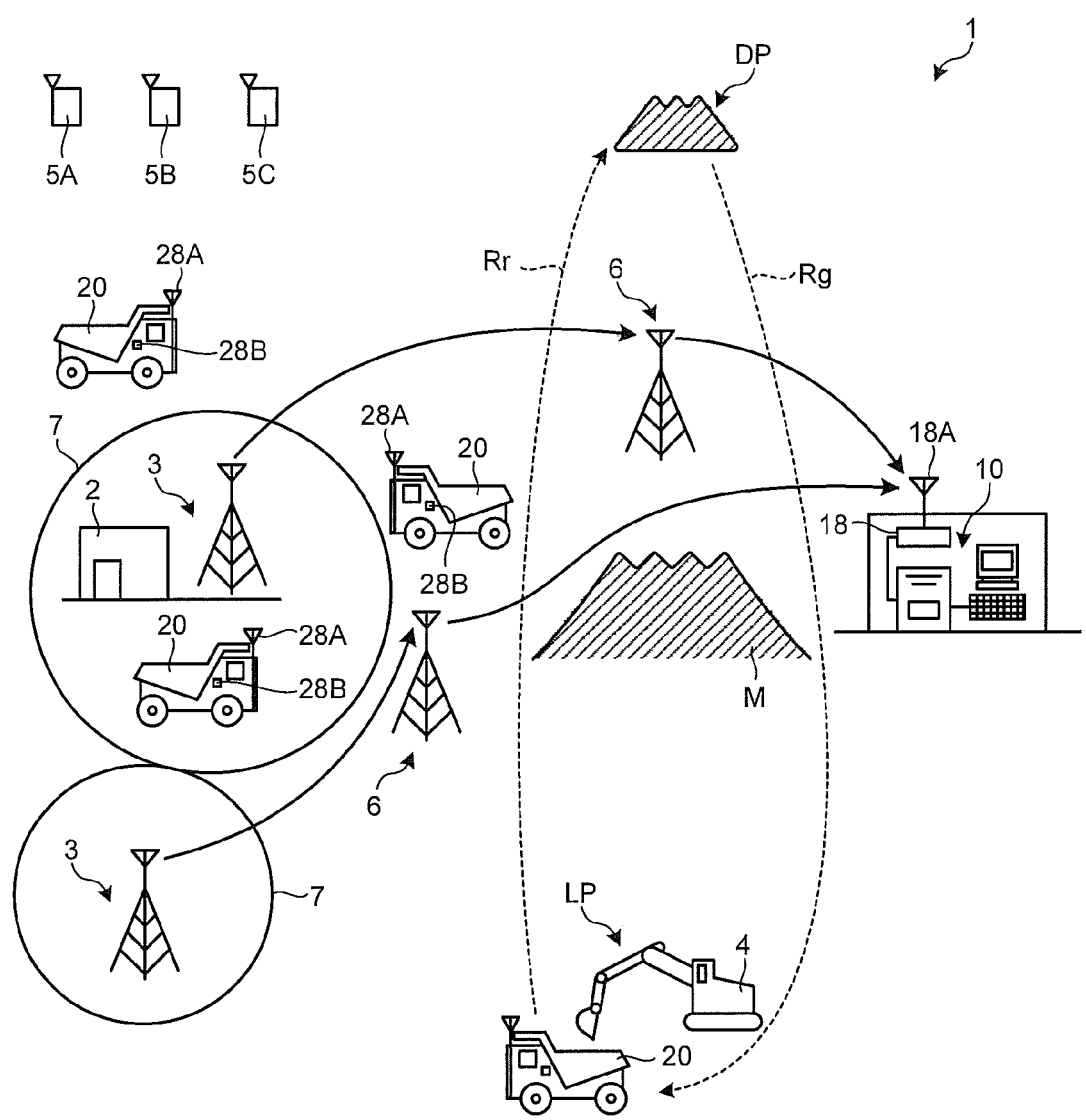
FIG. 1 is a figure illustrating a site to which a management system of a mining machine according to the present embodiment is applied.

FIG. 1 is a figure illustrating a site to which a management system of a mining machine according to the present embodiment is applied. A management system 1 of the mining machine finds the state of the mining machine by collecting information about the state of the mining machine, evaluates a route along which the mining machine travels (hereinafter, the travel route is considered to include not only a route along which a dump truck 20 travels and a location where the dump truck 20 stops, and the travel route will be hereinafter abbreviated as a route) in order to improve the productivity, generates an index concerning fuel consumption of the mining machine, and generates an index concerning how the driver drives the mining machine. The mining machine is a generic term meaning machines and the like used for various kinds of operations in the mine. In the present embodiment, the dump truck 20 for carrying, e.g., earth and sand or stones and rock generated during mining of crushed stone or crushed stone is explained as an example of a delivery vehicle which is a type of a mining machine, but the present embodiment is not limited thereto. For example, mining machine according to the present embodiment may be an excavator, an electric excavator, or a wheel loader which functions as an excavating machine for excavating crushed stones and the like. In the mine, stones and rocks or earth and sand are loaded to the dump truck 20 by an excavator 4 at a location where loading work is done (hereinafter, loading position) LP. Then, the dump truck 20 dumps the loaded stones and rocks or earth and sand at a position where dumping work of the load is done (hereinafter, dumping position) DP in order to unload the loaded stones and rocks or earth and sand. The dump truck 20 travels and moves between the loading position LP and the dumping position DP via routes Rg, Rr.

<Overview of the Management System of the Mining Machine>

In the management system of the mining machine (hereinafter referred to as management system as necessary) 1, a management device 10 collects, from the dump truck 20, operation information about the dump truck 20, which serves as a mining machine, by means of wireless communication. The management device 10 is different from the dump truck 20 which is a moving body, and for example, the management device 10 is installed in management facilities in a mine. As described above, basically, the management device 10 is not considered to move. The operation information about the dump truck 20 collected by the management device 10 is information about the operation state of the dump truck 20, and for example, the operation information includes position information (coordinate of latitude, longitude, and altitude), travel time, travel distance, engine water temperature, absence/presence of abnormality, abnormal position, fuel consumption rate or the amount of payload of the dump truck 20. The operation information is mainly used for, e.g., preventive maintenance and abnormality determination of the dump truck 20. Therefore, the operation information is useful for satisfying needs such as productivity improvement of the mine or improvement of operation of the mine.

In order for the management device 10 to collect the operation information about the dump truck 20 working in the mine, the management device 10 is connected to a management-side wireless communication device 18 having an antenna 18A. The dump truck 20 has an in-vehicle wireless communication device 27 as well as an antenna 28A in order to transmit the operation information and communicate with the management device 10. In addition, the dump truck 20 receives radio wave from GPS (Global Positioning System) satellites 5A, 5B, 5C with a GPS antenna 28B, and this enables the dump truck 20 to determine the position of itself. The position of the dump truck 20 itself may also be measured using not only GPS satellites but also other satellites for determining position. More specifically, the position may be measured by GNSS (Global Navigation Satellite System).

The output of the radio wave transmitted from the antenna 28A by the dump truck 20 does not have a communication range that covers the entire mine. The radio wave transmitted from the antenna 28A cannot be transmitted beyond an obstacle such as a high mountain due to the relationship of wavelength. When a wireless communication device capable of outputting a high power radio wave is used, this kind of communication failure may be solved, and the communication range can be extended to eliminate out-of-service locations, but the mine is very large, and it is necessary to reduce the cost of relaying devices and communication devices, and therefore, in order to cope with a situation that it is not expected to be able to ensure prepared communication infrastructure depending on the area where the mine is located, a wireless system capable of forming information communication network within a limited range such as a wireless LAN (Local Area Network) is used. When the wireless LAN and the like is used, it may be possible to prepare inter-communication between mining machines and management facilities (information collection device 10) at a low cost, but it is necessary to solve the problem of communication failure.

The coverage of the radio wave transmitted from the antenna 28A by the dump truck 20 is limited. Therefore, when the dump truck 20 and the management device 10 are away from each other, or when there exists an obstacle such as a mountain M between them, the management-side wireless communication device 18 is unable to receive the radio wave transmitted from the dump truck 20. For this reason, the management system 1 includes a relaying device 3 for relaying radio wave transmitted from the antenna 28A of the dump truck 20 to the management-side wireless communication device 18. When the relaying devices 3 are installed at multiple locations in the mine, the management device 10 can collect operation information and the like by means of wireless communication from the dump truck 20 operating at a location away from the management device 10.

When the relaying device 3 is far away from the management-side wireless communication device 18, an intermediate relaying device 6 is provided between the relaying device 3 and the management-side wireless communication device 18 in order to relay therebetween. In the present embodiment, the intermediate relaying device 6 simply relays communication between the relaying device 3 and the management-side wireless communication device 18, and does not relay the radio wave transmitted from the antenna 28A by the dump truck 20. In the present embodiment, the intermediate relaying device 6 is configured not to relay radio wave transmitted from anything other than the corresponding relaying device 3. For example, as illustrated in FIG. 1, only one intermediate relaying device 6 relays the radio wave transmitted from the relaying device 3 at a fuelling station 2. In FIG. 1, the intermediate relaying device 6 is represented as if it is associated with one relaying device 3 in one-to-one manner, but the embodiment is not limited to this one-to-one relationship. Each intermediate relaying device 6 can transmit radio waves sent from the multiple corresponding relaying devices 3.

A predetermined region around the center where the relaying device 3 is installed (in FIG. 1, a region represented as a circular shape) is a communication range 7 which is a range in which a first wireless communication device provided in the dump truck 20 (in-vehicle wireless communication device 27) can communicate with the relaying device 3 in both ways. The dump truck 20 located in the communication range 7 can wirelessly communicate with the management-side wireless communication device 18 via the relaying device 3 and the like.

When the management device 10 collects operation information and the like from the dump truck 20 by means of wireless communication, the dump truck 20 may run and move during transmission of operation information and the like to the management device 10, and the dump truck 20 may move out of the communication range 7, which causes interruption of the communication before transmission of all of the operation information and the like which is to be transmitted to the management device 10. Accordingly, while the management device 10 receives operation information and the like, i.e., while the dump truck 20 transmits operation information and the like, the dump truck 20 is preferably within the communication range 7. Therefore, to ensure that, the dump truck 20 is within the communication range 7, it is preferable to receive the radio wave from the antenna 28A of the dump truck 20 at a location where the dump truck 20 is at a stop. Therefore, it is preferable to control the dump truck 20 to transmit the operation information and the like to the relaying device 3 at a location where the dump truck 20 stops within the communication range 7 for a certain period of time (i.e., a period of time which is sufficient to transmit all the operation information and the like to be transmitted).

Therefore, in the present embodiment, for example, the relaying device 3 is installed at the fuelling station 2. At the fuelling station 2, the dump truck 20 is expected to stop for a certain period of time in order to fill fuel for driving the engine of the dump truck 20. Therefore, the dump truck 20 can maintain the state to be within the communication range 7 for the period of time allowing the management device 10 to receive, without fail, the operation information and the like from the dump truck 20 which is fueled. As a result, the management device 10 can collect, by means of wireless communication, the operation information and the like from the dump truck 20 without failure. Because the mine is huge, the present embodiment is configured to collect the operation information and the like also from the operating dump truck 20 by providing the relaying devices 3 not only at the fuelling station 2 but also in proximity to a route along which the dump truck 20 moves. Subsequently, the management device 10 will be explained in more details.

<Management Device>

Figure 2:
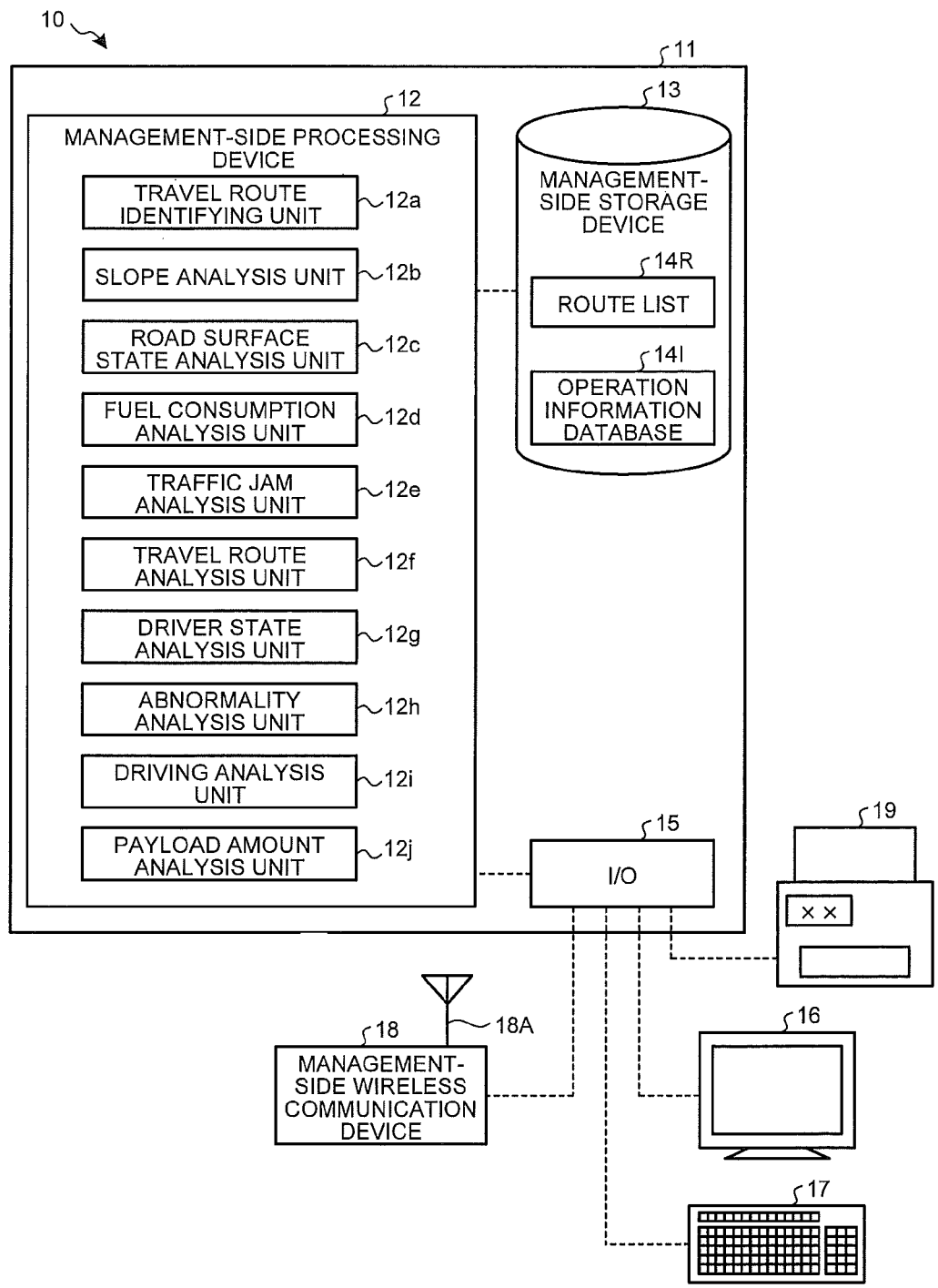
FIG. 2 is a functional block diagram illustrating a management device provided in a management system of a mining machine according to a first embodiment.

FIG. 2 is a functional block diagram illustrating a management device provided in the management system of the mining machine according to the first embodiment. The management device 10 includes a management-side processing device 12, a management-side storage device 13, and an input/output unit (I/O) 15. Further, the management device 10 has the input/output unit 15 connected to a display device 16, an input device 17, the management-side wireless communication device 18, and an output device 19. The management device 10 is, for example, a computer. The management-side processing device 12 is, for example, a CPU (Central Processing Unit). The management-side storage device 13 is, for example, RAM (Random Access Memory), ROM (Read Only Memory), flash memory, or a hard disk drive, or a combination thereof. The input/output unit 15 is used as an input/output (interface) of information with the management-side processing device 12, the display device 16 connected externally to the management-side processing device 12, the input device 17, a management-side wireless communication device 18, and the output device 19.

The management-side processing device 12 executes the management method of the mining machine according to the present embodiment. The management-side processing device 12 includes a travel route identifying unit 12a, a slope analysis unit 12b, a road surface state analysis unit 12c, a fuel consumption analysis unit 12d, a traffic jam analysis unit 12e, a travel route analysis unit 12f, a driver state analysis unit 12g, an abnormality analysis unit 12h, a driving analysis unit 12i, and a payload amount analysis unit 12j.

The travel route identifying unit 12a identifies the route along which the dump truck 20 travels. The slope analysis unit 12b analyzes the route along which the dump truck 20 travels, and divides the route into ranges of slopes. The road surface state analysis unit 12c analyzes the state of the road surface of the route along which the dump truck 20 travels from the operation information about the dump truck 20. The fuel consumption analysis unit 12d extracts and analyzes information about the fuel consumption (e.g., distance that the dump truck 20 can travel with an amount of fuel serving as a unit, the amount of fuel consumption required to travel a predetermined distance, or the amount of fuel consumption per unit time) from the operation information about the dump truck 20. The traffic jam analysis unit 12e analyzes, e.g., presence or absence of traffic jam at, e.g., a travel path or a loading position LP, which is a portion of the route in the mine, from the operation information about the dump truck 20. The travel route analysis unit 12f performs analysis to determine whether the dump truck 20 is to change the route along which the dump truck 20 travels, based on, e.g., stop time and stop position of the dump truck 20. The driver state analysis unit 12g analyzes, e.g., driver's attendance state or the degree of fatigue of the driver, based on, e.g., the stop time and the stop position of the dump truck 20. The abnormality analysis unit 12h analyzes, e.g., the contents and absence/presence of abnormality occurred in the dump truck 20 from the operation information about the dump truck 20. The driving analysis unit 12i analyzes the driving skill of the driver of the dump truck 20 from the operation information about the dump truck 20. The payload amount analysis unit 12j analyzes the payload state and the like of the dump truck 20 from the amount of payload included in the operation information about the dump truck 20. These functions are achieved by causing the management-side processing device 12 to read corresponding computer programs from the management-side storage device 13, and execute the computer programs.

The management-side storage device 13 stores operation information collection computer programs for collecting the operation information about the dump truck 20 and the like, route-identifying computer programs for identifying the route along which the dump truck 20 travels by achieving the management method of the mining machine according to the present embodiment, computer programs for achieving various kinds of analyses based on the operation information and the like, a route list 14R describing a route along which the dump truck 20 travels, and a database (operation information database) 141 including operation information which operation information collected from the dump truck 20. The route list 14R is a database describing a route along which the dump truck 20 is going to travel and a route along which the dump truck 20 has travelled, and is constituted by a set of data including coordinates of latitude, longitude and altitude.

In the present embodiment, the management device 10 identifies the route along which the dump truck 20 travels based on the position information about at least four locations which is included in a route along which the dump truck 20 moves from the dumping position DP to the loading position LP where the dump truck 20 loads the load (e.g., earth and sand or stones and rocks generated when mining crushed stone or crushed stone) and moves to the dumping position DP again. More specifically, the management device 10 identifies the route along which the dump truck 20 travels based on at least position information about the dumping position DP, position information about the loading position LP, and position information about two locations between the dumping position DP and the loading position LP. The route-identifying computer program describes commands for achieving processing for identifying the route along which the dump truck 20 travels based on at least the position information at four locations described above. The management device 10, or more specifically, the management-side processing device 12, reads the route-identifying computer program from the management-side storage device 13, and executes the commands described in the route-identifying computer program, thus identifying the route along which the dump truck 20 travels. The management device 10 stores information and data representing the identified route to the management-side storage device 13.

The display device 16 is, for example, a liquid crystal display and the like, and displays information required when collecting the operation information about the dump truck 20. The input device 17 is, for example, a keyboard, a mouse, a touch panel, or the like, and inputs information required when collecting the operation information about the dump truck 20. The management-side wireless communication device 18 has the antenna 18A, and executes wireless communication in both ways with the in-vehicle wireless communication device 27 of the dump truck 20 via the relaying device 3. The output device 19 is, for example, a printing device (printer). The output device 19 prints and outputs a report and the like generated by the management device 10. The output device 19 may further output voice sound in accordance with the contents of the report explained later. Subsequently, the dump truck 20 will be explained in more details.

<Dump Truck>

Figure 3:
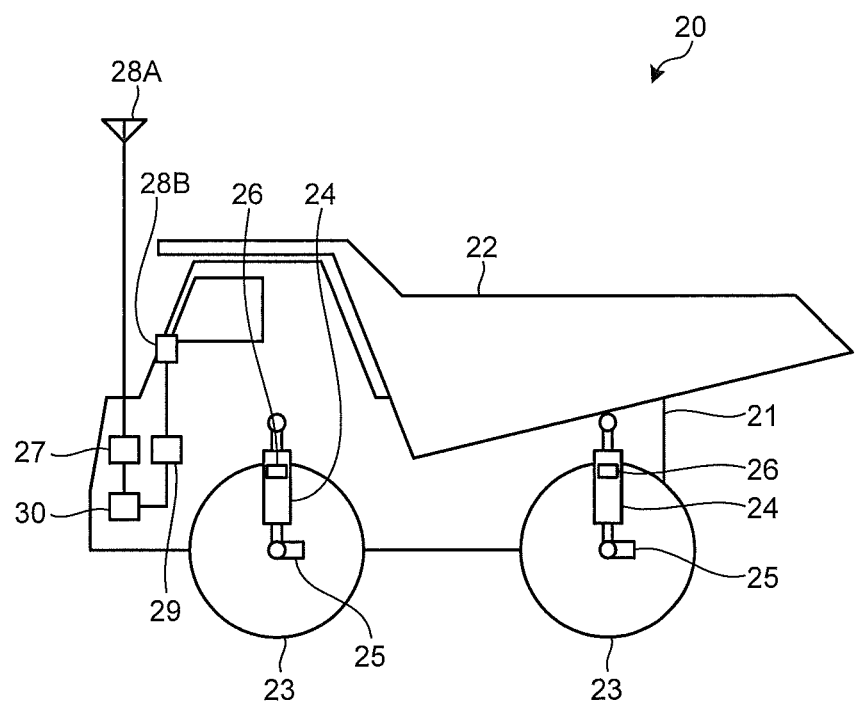
FIG. 3 is a diagram illustrating a configuration of a dump truck.

FIG. 3 is a diagram illustrating a configuration of a dump truck. The dump truck 20 carries the load and travels, and dumps the load at a desired location. The dump truck 20 includes a vehicle main body 21, a vessel 22, wheels 23, suspension cylinders 24, a speed sensor 25, a suspension pressure sensor (pressure sensor) 26, the in-vehicle wireless communication device 27 connected to the antenna 28A, a position information detection device (in the present embodiment, GPS receiver) 29 connected to the GPS antenna 28B, and an in-vehicle information collection device 30. The dump truck 20 includes various kinds of mechanisms and functions provided in a generally-available carrier in addition to the configuration. In the first embodiment, the dump truck 20 of a type steered with front wheels (wheels 23) is explained as an example, and the first embodiment can also be applied to an articulate-type dump truck of which vehicle body is divided into a front portion and a rear portion which are coupled with a freedom joint.

In the dump truck 20, a motor is driven with electric power generated by an internal-combustion engine such as a diesel engine driving an electric generator, and this motor drives the wheels 23. As described above, the dump truck 20 is a so-called electricity driven type, but the driving method of the dump truck 20 is not limited thereto. The vessel 22 functions as a carrier for carrying the load, and is provided on the upper portion of the vehicle main body 21. A loading machine 4 such as an excavator loads crushed stones, rocks, or soil which are quarried to the vessel 22 as the load. The wheel 23 is constituted by a tire and a wheel, and is attached to the vehicle main body 21. As described above, the wheels are driven when motive power is transmitted from the vehicle main body 21. The suspension cylinders 24 are provided between the wheels 23 and the vehicle main body 21. The vehicle main body 21, the vessel 22, and the load according to the weight of the load when the load is loaded is exerted on the wheels 23 via the suspension cylinders 24.

The speed sensor 25 measures the vehicle speed by detecting the rotational speed of the wheel 23. Operating oil is sealed in the suspension cylinder 24, which performs extension/contraction operation in accordance with the weight of the load. It should be noted that the suspension pressure sensor (which may also be referred to as pressure sensor as necessary) 26 detects the load exerted on the suspension cylinder 24. The pressure sensor 26 is installed in each suspension cylinder 24 of the dump truck 20, and by detecting the pressure of the operating oil, the pressure sensor 26 can measure the weight of the load (the amount of payload). The GPS antenna 28B receives radio waves which are output from multiple GPS satellites 5A, 5B, 5C (see FIG. 1) constituting the GPS (Global Positioning System). The GPS antenna 28B outputs the received radio waves to the position information detection device 29. The position information detection device 29 converts the radio waves received by the GPS antenna 28A into an electric signal, and calculates (measures) position information about itself, i.e., position information about the dump truck 20. The in-vehicle wireless communication device 27 performs wireless communication, in both ways, with the relaying device 3 or the antenna 18A of the management facilities as illustrated in FIG. 1 with the antenna 28A. The in-vehicle wireless communication device 27 is connected to the in-vehicle information collection device 30. With such structure, the in-vehicle information collection device 30 transmits and receives each piece of information via the antenna 28A. Subsequently, the in-vehicle information collection device 30 and peripheral devices thereof will be explained.

<In-Vehicle Information Collection Device and Peripheral Device Thereof>

Figure 4:
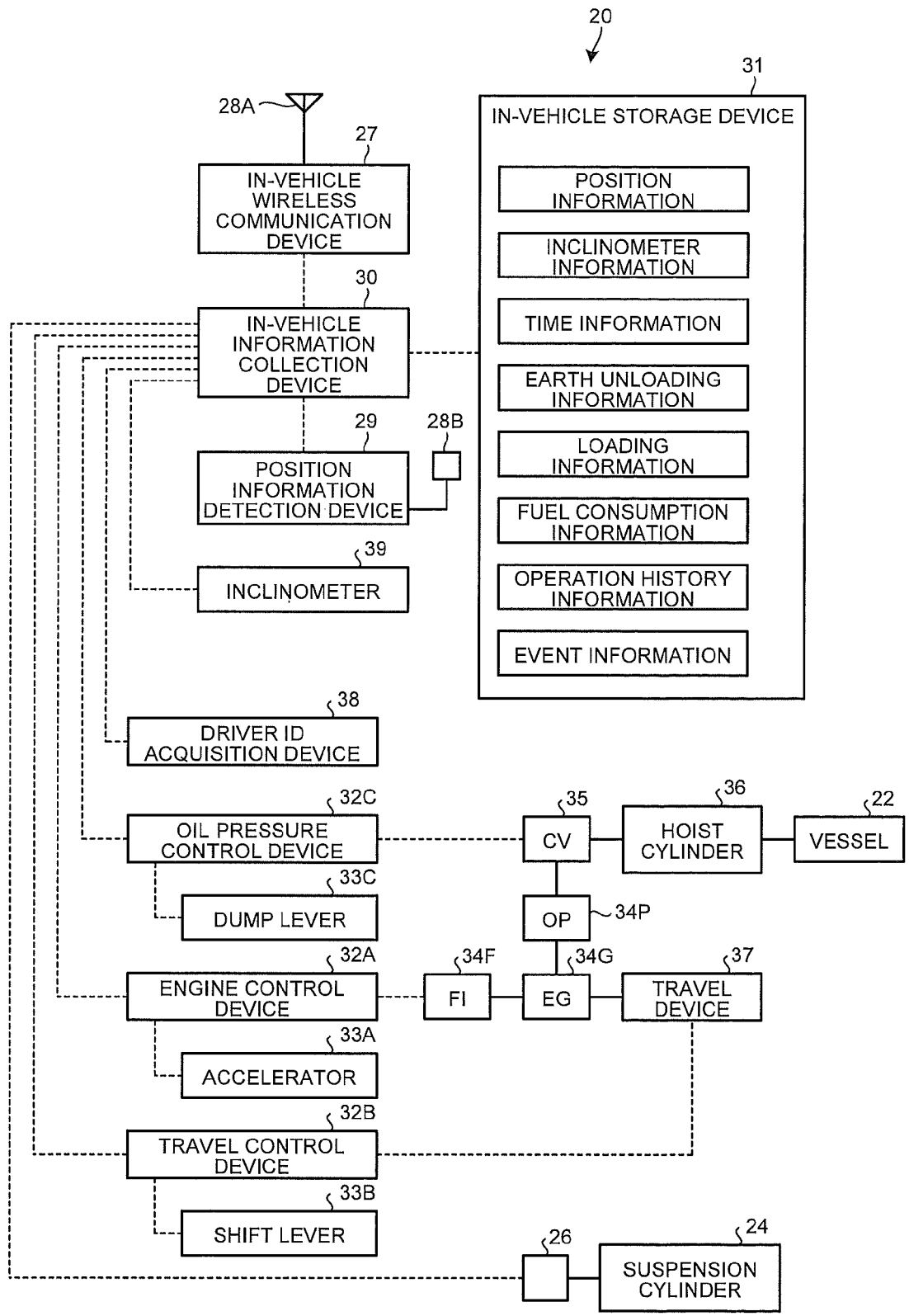
FIG. 4 is a functional block diagram illustrating an in-vehicle information collection device and peripheral devices thereof.

FIG. 4 is a functional block diagram illustrating an in-vehicle information collection device and peripheral devices thereof. The in-vehicle information collection device 30 provided in the dump truck 20 is connected to an in-vehicle storage device 31, the in-vehicle wireless communication device 27, and the position information detection device 29. The in-vehicle information collection device 30 is further connected to a state acquisition device. The in-vehicle information collection device 30 is, for example, a computer including a CPU (Central Processing Unit) and memory.

The in-vehicle information collection device 30 is a device for obtaining and collecting information about various kinds of operation states of the dump truck 20 serving as the mining machine. For example, the state acquisition device includes various kinds of sensors and the like such as the pressure sensor 26 installed in the suspension cylinder 24, an engine control device 32A, a travel control device 32B, an oil pressure control device 32C, a driver ID acquisition device 38, an inclination sensor (inclinometer) 39, and the like. The in-vehicle information collection device 30 acquires information about various kinds of operation states of the dump truck 20 from such state acquisition device, and collects the obtained information as the operation information.

For example, the in-vehicle information collection device 30 obtains the amount of control of a fuel injection device (FI) 34F from the engine control device 32A, thus obtaining information representing the fuel injection quantity. Based on the information representing the fuel injection quantity, the information about the fuel consumption can be obtained. The in-vehicle information collection device 30 can obtain information representing the amount of operation of an accelerator 33A by means of the engine control device 32A. Based on the information about the amount of operation of the accelerator 33A by the driver of the dump truck 20, the operation state of the driver of the dump truck 20 can be found. The in-vehicle information collection device 30 can obtain various kinds of information about, e.g., the rotational speed, the cooling water temperature, and the lubricating oil pressure force of an engine (EG) 34G from the engine control device 32A. The information about the engine speed of the engine (EG) 34G is obtained from the rotational speed detected with a speed sensor and the like attached to the output shaft of the engine (EG) 34G, not illustrated, and various kinds of information about, e.g., the cooling water temperature and the lubricating oil pressure force is also obtained with a temperature sensor and a pressure sensor, not illustrated.

In addition, the in-vehicle information collection device 30 can obtain various kinds of information about a travel device 37 such as the state of transmission and the rotational speed of the drive shaft from the travel control device 32B. The in-vehicle information collection device 30 obtains the operation position or the amount of operation of a shift lever 33B by way of the travel control device 32B, thus finding the operation state of the driver of the dump truck 20. The shift lever 33B is used by the driver to command the travel control device 32B to change forward, backward, or gears of the cruising speed of the dump truck 20.

Further, the in-vehicle information collection device 30 obtains the open/close state of a operating oil control valve (CV) 35 from the oil pressure control device 32C. In this example, the operating oil control valve 35 provides operating oil, discharged from an oil pump (OP) 34P driven by operation of the engine 34G, to a hoist cylinder 36 for moving up and down the vessel 22, and discharges the operating oil from the hoist cylinder 36. Therefore, the in-vehicle information collection device 30 can find the ascent/descent state of the vessel 22 based on the open/close state of the operating oil control valve 35. The vessel 22 ascends and descends when the driver operates a dump lever 33C. For this reason, the in-vehicle information collection device 30 can also find the ascent/descent state of the vessel 22 by obtaining the amount of operation or operation position of the dump lever 33C by means of the oil pressure control device 32C.

The in-vehicle information collection device 30 obtains the pressure exerted on the operating oil of the suspension cylinder 24 detected by the pressure sensor 26, thus finding the weight of the load loaded on the vessel 22. The weight of the load (the amount of payload) can be obtained by adding measurement values represented by the pressure sensors 26 provided on the wheels 23 of the dump truck 20 (when there are four wheels 23, four pressure sensors 26 are provided). It is possible to know whether the load is loaded onto the vessel 22 of the dump truck 20 or the load is being unloaded from the vessel 22 (has been unloaded) by checking the time change of the pressure exerted on the operating oil of the suspension cylinder 24 detected by the pressure sensor 26. For example, when the pressure detected by the pressure sensor 26 increases to become more than a predetermined value (for example, value corresponding to half of the amount of defined payload of the dump truck 20), it may be possible to determine that the load is loaded at the loading position LP. When the pressure detected by the pressure sensor 26 decreases to become less than a predetermined value (for example, value corresponding to ¼ of the amount of defined payload of the dump truck 20), it may be possible to determine that the load is being unloaded (or has been unloaded) at the dumping position DP. In the determination of unloading or loading, the accuracy of determination can be improved based on not only the pressure exerted on the operating oil of the suspension cylinder 24 detected by the pressure sensor 26 but also, for example, the operation state of the dump lever 33C (operation position or the amount of operation) or the position information about the dump truck 20.

The driver ID acquisition device 38 is a device for obtaining the driver ID for determining the driver of the dump truck 20. The dump truck 20 may be driven by multiple drivers in turns. The driver ID can be obtained from, for example, an ID key of an individual driver (an electronic key storing individual identification information) or an ID card of an individual driver (a card storing individual identification information). In this case, the driver ID acquisition device 38 may be, e.g., a magnetic reading device or a wireless communication device. In addition, a fingerprint authentication device may be provided as the driver ID acquisition device 38, and fingerprint authentication may be performed by comparing a finger print of a driver stored in advance and a fingerprint of an individual driver, so that the driver ID can be obtained. The driver ID can also be obtained by allowing an individual driver to input ID information (individual identification information such as PIN ID) of himself/herself with an input device and comparing it with ID information stored in advance. As described above, the driver ID acquisition device 38 is, e.g., a reading device of an ID key or an ID card, a fingerprint authentication device, or an ID information input device, and may be provided in proximity to the driver's seat in the driver's cab of the dump truck 20, or may be provided at any location of the vehicle body 21 where the driver comes close to when the driver accesses the driver's cab. It should be noted that, in accordance with production planning of the mine on each day, the driver ID of the driver who drives each dump truck 20 may be transmitted from the management device 10 to the dump truck 20 by means of wireless communication. In this case, the in-vehicle wireless communication device 27 also serves as the driver ID acquisition device 38. Based on the driver ID obtained by the driver ID acquisition device 38, which driver is driving the dump truck 20 can be identified.

The inclination sensor 39 detects the inclination of the dump truck 20. The inclination sensor 39 can detect the inclination of the dump truck 20 in the longitudinal direction and in the width direction. The inclination sensor 39 can detect the slope or bumps on the road surface on which the dump truck 20 is travelling.

The in-vehicle storage device 31 is, for example, RAM (Random Access Memory), ROM (Read Only Memory), flash memory, or a hard disk drive, or a combination thereof. The in-vehicle storage device 31 stores, e.g., computer programs describing commands for causing the in-vehicle information collection device 30 to collect operation information and various setting values for operating the management system 1 of the mining machine. The in-vehicle information collection device 30 reads the computer program, and obtains the operation information from the state acquisition device with predetermined timing, and temporarily stores the operation information to the in-vehicle storage device 31. At this occasion, the in-vehicle information collection device 30 may perform statistical processing to derive, e.g., a mean value, a most frequent value, and a standard deviation value for the information about the same item.

The in-vehicle storage device 31 stores, as the operation information, position information, inclinometer information, time information, earth unloading information, loading information, fuel consumption information, operation history information, event information, and the like. The above operation information stored in the in-vehicle storage device 31 is merely example, and the operation information is not limited thereto. The position information, the inclinometer information, the earth unloading information, the fuel consumption information, the operation history information, the event information, and the like are stored to the in-vehicle storage device 31 in association with the time of occurrence (the time when the in-vehicle information collection device 30 obtains the information). The in-vehicle information collection device 30 receives a command signal representing a request given by the information collection device 10 by means of wireless communication as illustrated in FIG. 2, and transmits, via the in-vehicle wireless communication device 27, the operation information stored in the in-vehicle storage device 31 to the information collection device 10.

In the present embodiment, the in-vehicle information collection device 30 can identify the route the dump truck 20 has travelled based on the position information about the designated route set in advance and the position information about at least four locations included in the route along which the dump truck 20 moves from the location where the dump truck unloads the load to the location where the dump truck 20 loads the load and the dump truck 20 moves again back to the location where the dump truck 20 unloads the load, which is included in the operation information. The designated route is set in advance between the dumping position DP and the loading position LP, and is the route registered in the management-side storage device 13. The designated route is designed by an administrator or an operator of the mine. In addition, the designated route is temporarily changed due to abruptly occurring phenomenon such as change of weather or occurrence of obstacles, and also includes the route registered to the management-side storage device 13. The dump truck 20 can identify the route of the dump truck 20 by reading and executing the computer program describing the processing for identifying the route along which the dump truck 20 travels, which is stored in the in-vehicle storage device 31 (route-identifying computer program). In this case, the in-vehicle storage device 31 may obtain, from the management-side storage device 13, information about the designated route via the in-vehicle wireless communication device 27 when identifying the route, or the information about the designated route may be stored to the in-vehicle storage device 31 in advance. Subsequently, an example of processing for identifying the route of the dump truck 20 (route identifying processing) performed by the management method of the mining machine according to the present embodiment will be explained.

<Route Identifying Processing>

Figure 5:
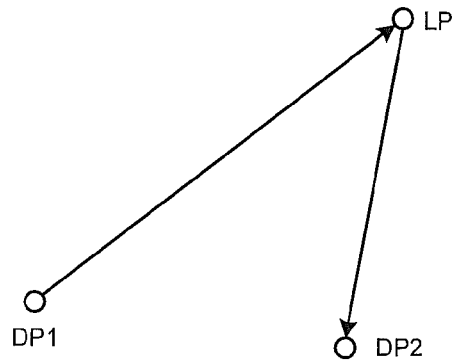
FIG. 5 is a schematic diagram of route.
Figure 6:
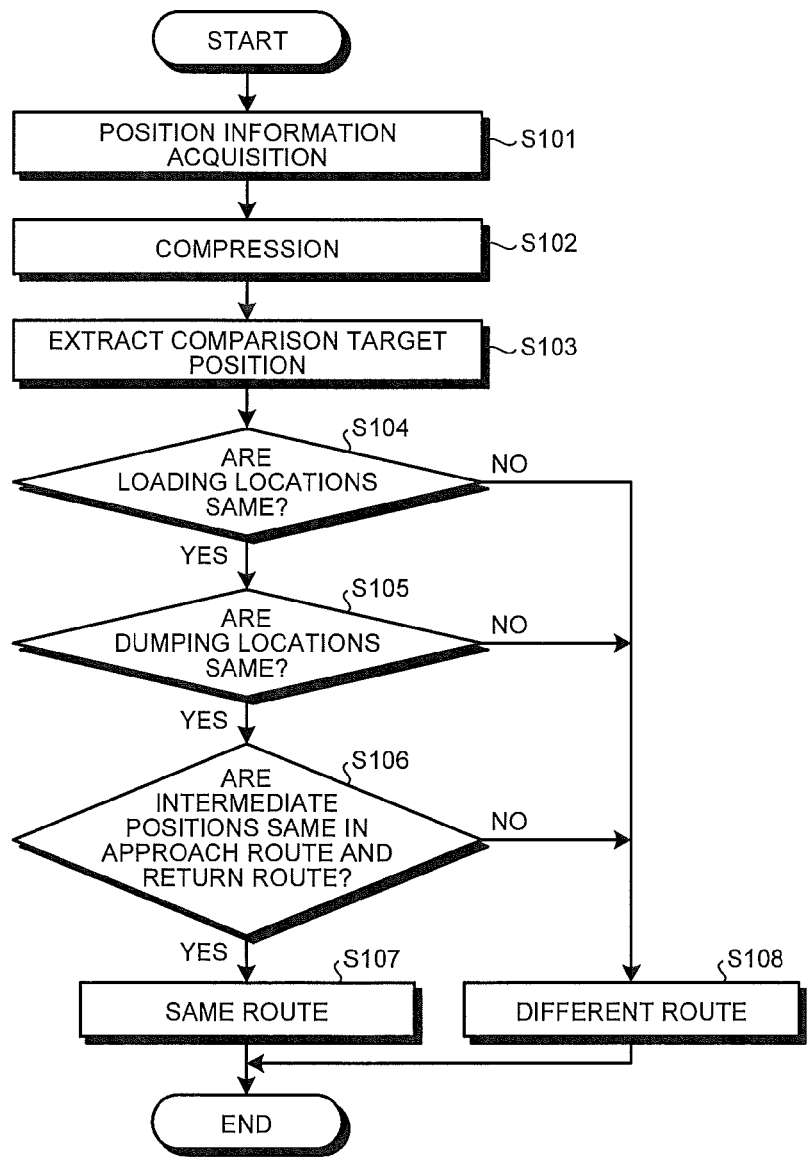
FIG. 6 is a flowchart illustrating a procedure of route identifying processing according to the present embodiment.
Figure 7:
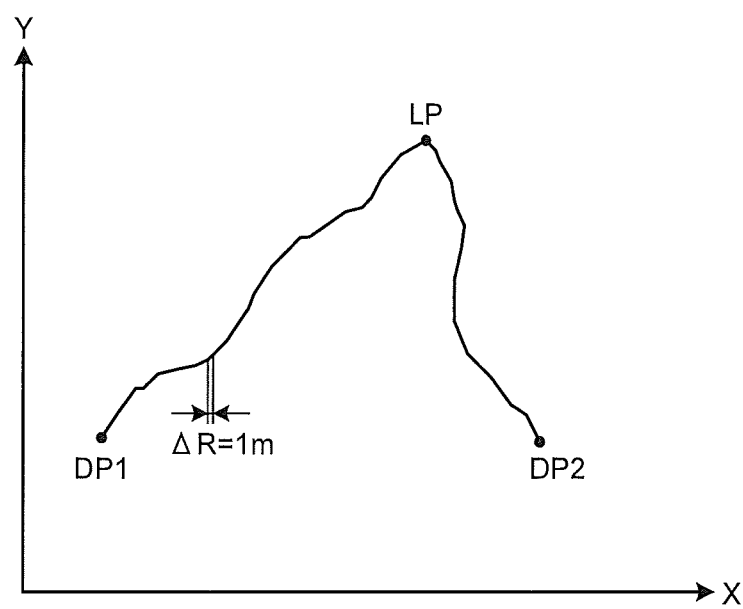
FIG. 7 is a figure illustrating procedure for compressing the number of pieces of data in the route identifying processing.
Figure 8:
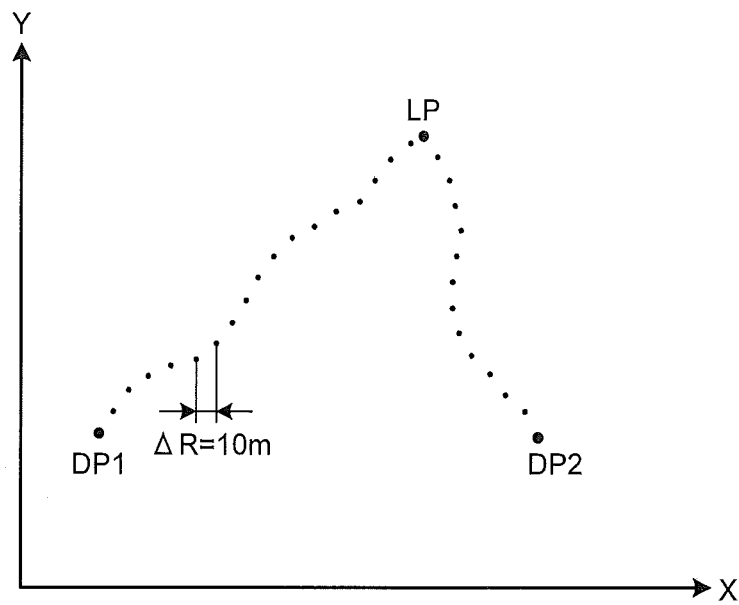
FIG. 8 is a figure illustrating procedure for compressing the number of pieces of data in the route identifying processing.
Figure 9:
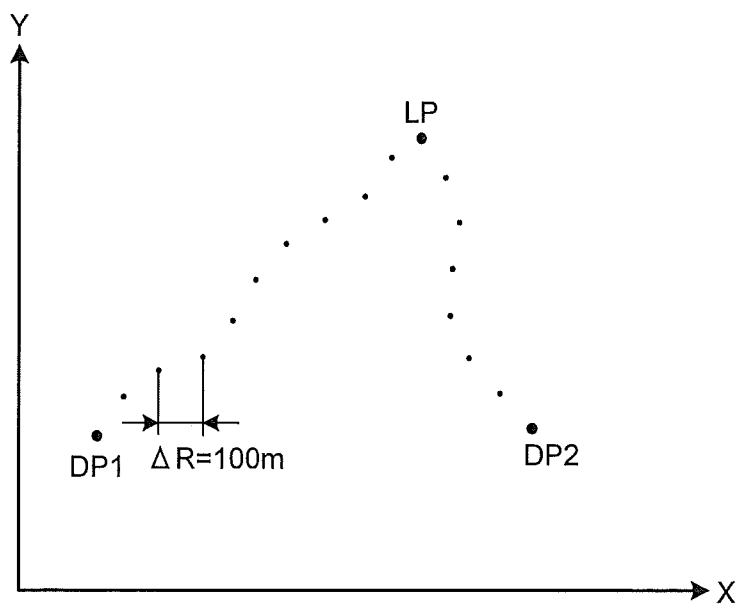
FIG. 9 is a figure illustrating procedure for compressing the number of pieces of data in the route identifying processing.

FIG. 5 is a schematic diagram of route. FIG. 6 is a flowchart illustrating a procedure of route identifying processing according to the present embodiment. FIGS. 7 to 9 are figures illustrating procedure for compressing the number of pieces of data in the route identifying processing. In the explanation below, an example for identifying the route along which the dump truck 20 of which operation information is obtained using the operation information which the management device 10 obtains from the dump truck 20 by means of wireless communication will be explained.

In the route identifying processing according to the present embodiment, the route along which the dump truck 20 travels is identified in one cycle of conveying work of the dump truck 20. The one cycle of the conveying work is as follows: the dump truck 20 unloads the load at the dumping position (first dumping position) DP1, and thereafter moves, without any load, to the loading position LP; and at the loading position LP, the load is loaded to the dump truck 20, and thereafter, the dump truck moves to the dumping position (second dumping position) DP2 where the dump truck unloads the load. The first dumping position DP1 and the second dumping position DP2 may be different locations, or may be the same location.

When the route identifying processing according to the present embodiment is executed, the travel route identifying unit 12a of the management-side processing device 12 provided in the management device 10 as illustrated in FIG. 2 obtains position information about the dump truck 20 from the operation information obtained from the dump truck 20 in step S101. The position information is obtained by the position information detection device 29 as described above. In the position information, the coordinates of multiple positions in the route long which the dump truck 20 moves in one cycle of the conveying work are associated with the times when the dump truck 20 was at these positions, respectively. In step S101, the travel route identifying unit 12a obtains both of the position information and a time associated therewith.

Subsequently, in step S102, the travel route identifying unit 12a compresses the number of pieces of data of multiple pieces of position information collected by the in-vehicle information collection device 30. As described above, the position information includes the coordinate of latitude, longitude and altitude. Where the coordinate of the latitude is denoted as X, the coordinate of the longitude is denoted as Y, and the coordinate of the altitude is denoted as Z, the position information about the position P can be denoted as P (X,Y, Z). When the dump truck 20 is operating, the in-vehicle information collection device 30 collects the details of the position information, and therefore, the state of the original data includes much position information. More specifically, the in-vehicle information collection device 30 collects much position information for one cycle of the conveying work in the state where no processing is performed. The latitude is represented as the X axis, and the longitude is represented as the Y axis, and, for example, the position information of one cycle of the conveying work is expressed as follows. As a result of reduction of the interval of adjacent position information, it is represented in a linear manner as illustrated in FIG. 7.

However, in the route identifying processing according to the present embodiment, position information in details as much as the original data (the number of pieces of data) is not required. In the present embodiment, the route is identified based on the position information at two locations between the dumping position DP and the loading position LP, and therefore, detailed position information is not necessary because it is sufficient to identify these positions within a certain range. Moreover, if detailed position information is used, precise matching corresponding to the detailed information is required when identifying the route, and therefore, it is difficult to identify the positions. For this reason, when the numerical value of the coordinate of the latitude and the longitude in the position information is rounded, the interval $\Delta R$ between adjacent position information of multiple pieces of position information included in one cycle of the conveying work is increased. As a result, it becomes easy to identify the route.

When the numerical value of the coordinate of the latitude and the longitude measured by the position information detection device 29 has five places of decimals, the interval $\Delta R$ between adjacent position information is about 1 m (see FIG. 7). In this case, when the numerical value of the coordinate of the latitude and the longitude is rounded to four decimal places, the interval $\Delta R$ between adjacent position information is about 10 m as illustrated in FIG. 8, and when the numerical value of the coordinate of the latitude and the longitude is rounded to three decimal places, the interval $\Delta R$ between adjacent position information is about 100 m as illustrated in FIG. 9. To identify the route, about 100 m is sufficient for the interval $\Delta R$ between adjacent position information. In the present embodiment, the travel route identifying unit 12a rounds the numerical values of position information about multiple locations included in the route of one cycle of the conveying work. More specifically, the travel route identifying unit 12a rounds, to decimal places less than the decimal places of the original data, the numerical value of the coordinate of the latitude and the longitude for the original data of the position information included in one cycle of the conveying work. By doing so, position information having the degree of accuracy suitable for the route identifying processing according to the present embodiment can be obtained. With the above rounding processing explained above, the position information used to identify the route includes less number of pieces of data than the original data (compressed).

When the position information of the original data is compressed in step S102, step S103 is subsequently performed, and the travel route identifying unit 12a identifies a target position (comparison target position) which is to be compared with a registered existing route, stored in the management-side storage device 13, for example, when identifying the route. Subsequently, a modification of the method for compressing the number of pieces of data of multiple pieces of position information will be explained.

<Modification of Data Compression>

Figures 10, 11:
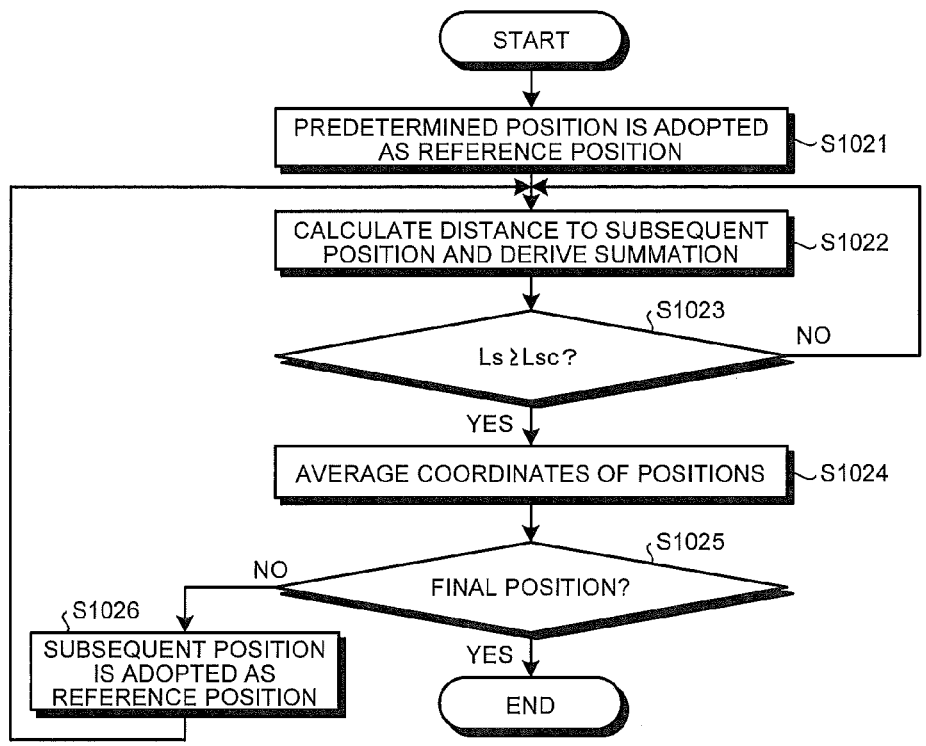
Figure 12:
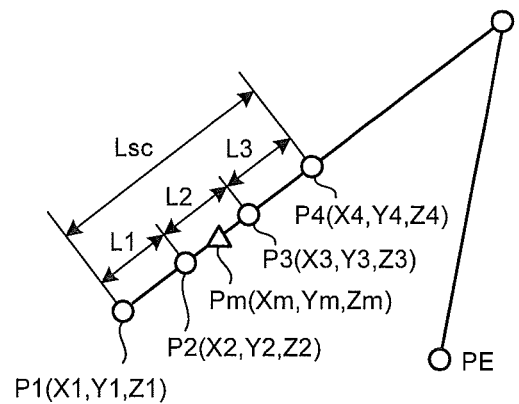
FIG. 12 is a schematic diagram illustrating processing for identifying comparison target position.

FIG. 10 is a chart illustrating relationship of position information, travel distance, and the like. FIG. 11 is a flowchart illustrating a procedure of processing for identifying comparison target position. FIG. 12 is a schematic diagram illustrating processing for identifying comparison target position. The in-vehicle information collection device 30 obtains the position of the dump truck 20 from the position information detection device 29 as illustrated in FIG. 4, and stores it to the in-vehicle storage device 31 as position information with a predetermined time interval (sampling time). The time of FIG. 10 represents the time when the in-vehicle information collection device 30 collected the position information, and the time interval is the same. More specifically, where the time interval is $\Delta t$, the following equations hold: $t2=t1+\Delta t$, $t3=t2+\Delta t$, $ti+1=ti+\Delta t$ (i is an integer equal to or more than one but equal to or less than n).

In the present modification, when the in-vehicle information collection device 30 compresses the number of pieces of data of multiple pieces of position information per one cycle of the conveying work collected with the predetermined time interval $\Delta t$, a predetermined position is adopted as a reference position in step S1021. For example, when a position at a time t1 as illustrated in FIG. 10 is adopted as the reference position, a position P1 (X1, Y1, Z1) is the reference position, and when a position at a time ti is adopted as the reference position, a position Pi (Xi, Yi, Zi) is the reference position. In this example, the position P1 (X1, Y1, Z1) is the reference position.

Subsequently, in step S1022, the travel route identifying unit 12a calculates a distance L1 from the reference position to a subsequent position P2 (X2, Y2, Z2), and derives a summation. In this case, in the time t1, the dump truck 20 travels at a vehicle speed V1, and therefore, the distance L1 to the subsequent position P2 (X2, Y2, Z2) is a product $\Delta t \times V1$ of the time interval $\Delta t$ and the vehicle speed V1 at the time t1. At this occasion, the total travel distance is as follows: Ls=L1.

Subsequently, step S1023 is performed, and when the total travel distance Ls is determined to be equal to more than a predetermined defined distance Lsc defined in advance (step S1023, Yes), step S1024 is subsequently performed. With the processing according to the present modification, the interval between adjacent position information is about the same as the defined distance Lsc. The degree of compression of the number of pieces of data is determined in accordance with the defined distance Lsc, and therefore, the defined distance Lsc is set so that the position information can be obtained with the degree of accuracy suitable for the route identifying processing according to the present embodiment. In the present modification, the defined distance Lsc is about 100 m.

When the total travel distance Ls is less than the defined distance Lsc (step S1023, No), step S1022 is performed again, and the travel route identifying unit 12a calculates a distance L2 from a previous position P2 (X2, Y2, Z2) to a subsequent position P3 (X3, Y3, Z3), and derives a summation thereof. The total travel distance Ls is L1+L2. The distance L2 is a product of the vehicle speed V2 and the time interval $\Delta t$, i.e., $\Delta t \times V2$.

Suppose that, when the total travel distance Ls is L1+L2+L3, the total travel distance Ls is equal to or more than the defined distance Lsc. In this case, in step S1024, the travel route identifying unit 12a averages the coordinates of the positions from the reference position to the position where the condition is satisfied (Ls≥Lsc) (in this example, P3). In this case, a position P1 (X1, Y1, Z1), a position P2 (X2, Y2, Z2), and a position P3 (X3, Y3, Z3) are included, and therefore, the coordinates thereof are averaged. A position Pm (Xm, Ym, Zm) having a mean value of these coordinates is an average position within the defined distance Lsc (see FIG. 12).

Subsequently, step S1025 is performed, and when the current position is the final position PE of the dump truck 20 in one cycle of the conveying work (step S1025, Yes), the data compression according to the present modification is finished. When the current position is not the final position PE of the dump truck 20 in one cycle of the conveying work (step S1025, No), step S1026 is subsequently performed. In step S1026, the travel route identifying unit 12a determines that a position (in this example, position P4) subsequent to a position (in this example, position P3) where the condition is satisfied (Ls≥Lsc) is the reference position. Then, step S1022 is performed again to repeat the subsequent procedure.

In the present modification, the moving distance in one cycle of the conveying work is divided at every defined distance Lsc, and the multiple positions are represented by the position obtained by averaging coordinates of multiple positions included in the defined distance Lsc. According to such method, the number of pieces of data of multiple pieces of position information can be compressed. The method for compressing the number of pieces of data of multiple pieces of position information may not be limited to the above two methods, and other methods may also be used. Subsequently, the pattern of the route along which the dump truck 20 travels will be explained.

Figure 13:
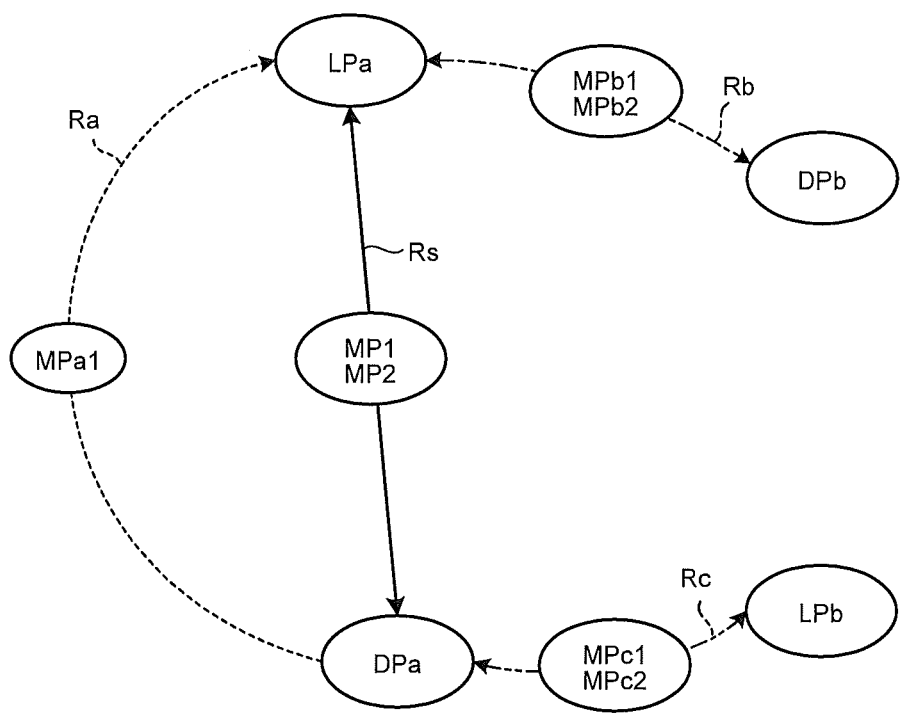
FIG. 13 is a schematic diagram illustrating a pattern of a route along which a dump truck travels.

FIG. 13 is a schematic diagram illustrating a pattern of the route along which the dump truck 20 travels.

In the explanation below, movement from the dumping position to the loading position will be referred to as an approach route, and movement from the loading position to the dumping position will be referred to as a return route. In this example, dumping positions DPa, DPb are different from each other, and loading positions LPa, LPb are different from each other. As a first pattern, the dump truck 20 reciprocally travels between the dumping position DPa and the loading position LPa along the same route Rs in which both of the approach route and the return route are the same. As a second pattern, the dump truck 20 reciprocally travels between the dumping position DPa and the loading position LPa, in which the approach route and the return route are different. In this case, the approach route is a route Ra, and the return route is a route Rs.

As a third pattern, the loading position LPa may be the same as the first pattern, but the load is unloaded at the dumping position DPb in the third pattern although the load is unloaded at the dumping position DPa in the first pattern. In this case, the dump truck 20 reciprocally travels the same route Rb. As a fourth pattern, the dumping position DPa is the same as the first pattern, but the load is loaded at the loading position LPb in the fourth pattern although the load is loaded at the loading position LPa in the first pattern. In this case, the dump truck 20 reciprocally travels the same route Rc.

Further, as a fifth pattern, the loading position LPa is the same, but the dump truck 20 moves between different dumping positions Dpa, Dpb and the loading position LPa. In this case, the approach route is the route Rs, and the return route is the route Rb. As a sixth pattern, the dumping position DPa is the same, but the dump truck 20 moves between different loading positions Lpa, Lpb and the dumping position DPa. In this case, the dump truck 20 reciprocally travels the routes Rs, Rc. The fifth pattern and sixth pattern occurs when the route is switched, but they occur only in rare cases, and therefore, in normal circumstances, they may be excluded from the specifying of the route.

In the first pattern, determination is made as follows. Cycles of multiple conveying works are compared, and when the position information about the dumping position DPa, the position information about the loading position LPa, and the position information about the intermediate positions MP1, MP2 between the dumping position DPa and the loading position LPa are the same, i.e., when the data of latitude, longitude and altitude of the above position information are the same, the route is determined to be the same. The intermediate positions MP1, MP2 may be located between the dumping position DPa and the loading position LPa, and this does not necessarily mean the position where the distances from both of them are the same (this is applicable to the following cases). In the second pattern, determination is made as follows. Cycles of multiple conveying works are compared, and when the position information about the dumping position DPa, the position information about the loading position LPa, the position information about the intermediate position MP1 (or MP2) of the route Rs, the position information about the intermediate position MPa1 of the route Ra are the same, i.e., when the data of latitude, longitude and altitude of the above position information are the same, the route is determined to be the same.

In the third pattern, determination is made as follows. Cycles of multiple conveying works are compared, and when the position information about the dumping position DPb, the position information about the loading position LPa, and the position information about the intermediate positions MPb1, MPb2 thereof are the same, i.e., when the data of latitude, longitude and altitude of the above position information are the same, the route is determined to be the same. In the fourth pattern, determination is made as follows. Cycles of multiple conveying works are compared, and when the position information about the dumping position DPa, the position information about the loading position LPb, and the position information about the intermediate positions MPc1, MPc2 thereof are the same, i.e., when the data of latitude, longitude and altitude of the above position information are the same, the route is determined to be the same.

In the fifth pattern, determination is made as follows. Cycles of multiple conveying works are compared, and when the position information about the dumping position DPa, the position information about the loading position LPa, the position information about the dumping position DPb, the position information about the intermediate position. MP1 (or MP2) of the route Rs, the position information about the intermediate position MPb2 (or MPb1) of the route Rb are the same, i.e., when the data of latitude, longitude and altitude of the above position information are the same, the route is determined to be the same. In the sixth pattern, determination is made as follows. Cycles of multiple conveying works are compared, and when the position information about the dumping position DPa, the position information about the loading position LPa, the position information about the loading position LPb, the position information about the intermediate position MP1 (or MP2) of the route Rs, the position information about the intermediate position MPc1 (or MPc2) of the route Rc are the same, i.e., when the data of latitude, longitude and altitude of the above position information are the same, the route is determined to be the same.

In the cases of the first to the fourth patterns, i.e., when there is only one dumping position and one loading position, the route along which the dump truck 20 travels is identified based on the position information about four locations included in the route along which the dump truck 20 moves from the location where the dump truck 20 unloads the load to the location where the dump truck 20 loads the load and again moves to the location where the dump truck 20 unloads the load. In the cases of the fifth to the sixth patterns, i.e., when there are two dumping positions or when there are two loading positions, the route along which the dump truck 20 travels is identified based on the position information about five locations included in the route along which the dump truck 20 moves from the location where the dump truck 20 unloads the load to the location where the dump truck 20 loads the load and again moves to the location where the dump truck 20 unloads the load.

When compression of the data is finished in step S102, step S103 is subsequently performed, and the travel route identifying unit 12a extracts a comparison target position. The comparison target position includes the dumping position and the loading position, and are at least four positions included in the route along which the dump truck moves from the dumping position to the loading position and again moves to the dumping position. In the first pattern explained above, the travel route identifying unit 12a obtains, as the comparison target position, the position of the dumping position DPa, the position of the loading position LPa, the positions of the intermediate positions MP1, MP2 of them both, from the position information used to identify the route obtained in step S102. Then, the travel route identifying unit 12a defines the target of which route is to be identified in step S102. The travel route identifying unit 12a reads the existing route registered in the route list 14R of the management-side storage device 13, and extracts the comparison target position of them each.

The travel route identifying unit 12a identifies which of the first to the sixth patterns the target of which route is to be identified and the compared existing route correspond to, based on the number of the dumping positions, the number of the loading positions, and the intermediate position of them both. The registered existing routes may be registered in advance to the management-side storage device 13 with IDs for distinguishing the first to the sixth patterns attached thereto.

When the comparison target position is extracted from each of the target of which route is to be identified and the compared existing route, the travel route identifying unit 12a compares the comparison target position of them both. As a result, when the loading positions are the same (step S104, Yes), and when the dumping positions are the same (step S105, Yes), and when the intermediate position of them both (in the present embodiment, the intermediate position of them both) is the same in the approach route and the return route (step S106, Yes), the travel route identifying unit 12a determines that the target of which route is to be identified is the same route as the compared existing route (step S107).

The intermediate position of the loading position and the dumping position (the position explained as position information at two locations or intermediate position explained above) can be a position corresponding to a median value of the number of pieces of data after compression of the number of pieces of data of multiple pieces of position information collected by the in-vehicle information collection device 30, for example. For example, when the number of pieces of data existing between the loading position and the dumping position after the compression (the number of pieces of position information) is 11, each of the positions corresponding to the sixth data from the loading position and the dumping position is "the intermediate position". Alternatively, the position corresponding to a predetermined number of data counted from the loading position or the dumping position (the number of pieces of position information) may be "the intermediate position".

When the loading positions are different, and when the dumping positions are different, and when the intermediate positions of them both are different in any one of the approach route and the return route (No in any one of step S104, step S105, step S106), then the travel route identifying unit 12a determines that the target of which route is to be identified is a route different from the same route as the compared existing route (step S108). In this manner, the management device 10 distinguishes and identifies an unknown route along which the dump truck 20 travels in one cycle of the conveying work by the dump truck 20. According to the present embodiment, the route of one cycle of the conveying work of the dump truck 20 can be identified, and, for example, in the driving education of the driver or the runway design evaluation for the productivity improvement, analysis can be made for each route along which the dump truck 20 travels, and the result of the analysis is adequate. Subsequently, the postprocessing of the route identifying processing will be explained.

<Postprocessing of Route Identifying Processing>

Figure 14:
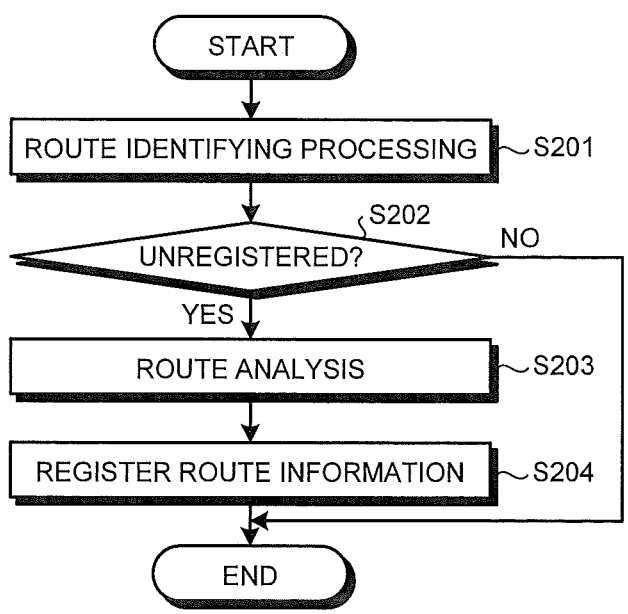
FIG. 14 is a flowchart illustrating a procedure of postprocessing of the route identifying processing.

FIG. 14 is a flowchart illustrating a procedure of postprocessing of the route identifying processing. In step S201, the travel route identifying unit 12a of the management device 10 executes the identifying processing of the route explained above. Subsequently, in step S202, it is determined that the route cannot be identified from the registered existing routes, the route is not yet registered in the route list 14R, i.e., the route is unregistered (step S202, Yes). In this case, step S203 is performed, and the slope analysis unit 12b of the management-side processing device 12 as illustrated in FIG. 2 executes the route analysis. The route analysis is processing for dividing the route into multiple sections of the slopes of the route, and attaching the slope information to the information about the route. The route analysis will be explained later. When the route analysis is finished, step S204 is performed, and the slope analysis unit 12b registers (saves) the result as the route information to the route list 14R. When it is determined that the route can be identified from the registered existing routes in step S202, the route is already registered to the route list 14R, and therefore, the postprocessing is finished without executing step S203 and step S204. Subsequently, the route analysis will be explained.

<Route Analysis>

Figure 15:
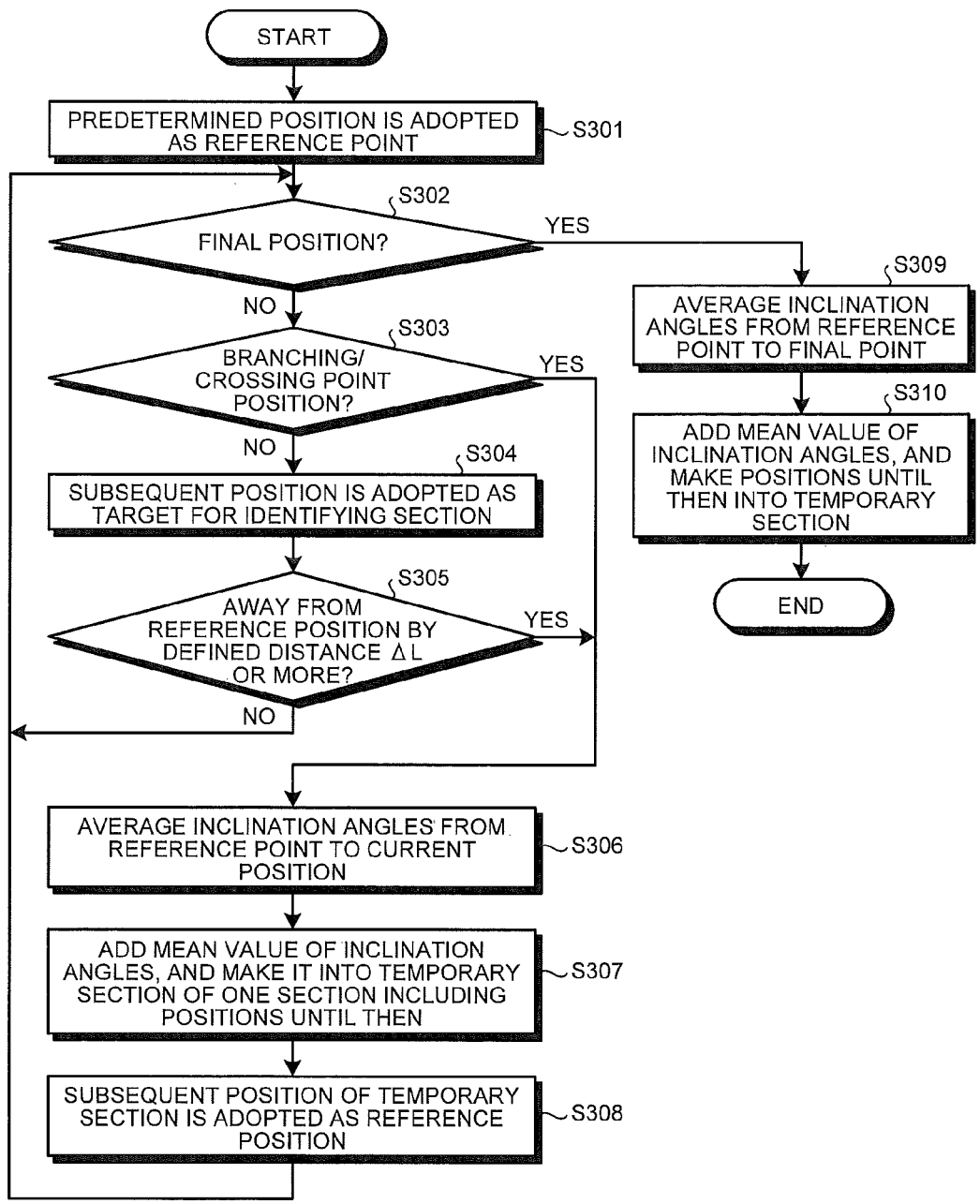
FIG. 15 is a flowchart illustrating a procedure of route analysis.
Figure 16:
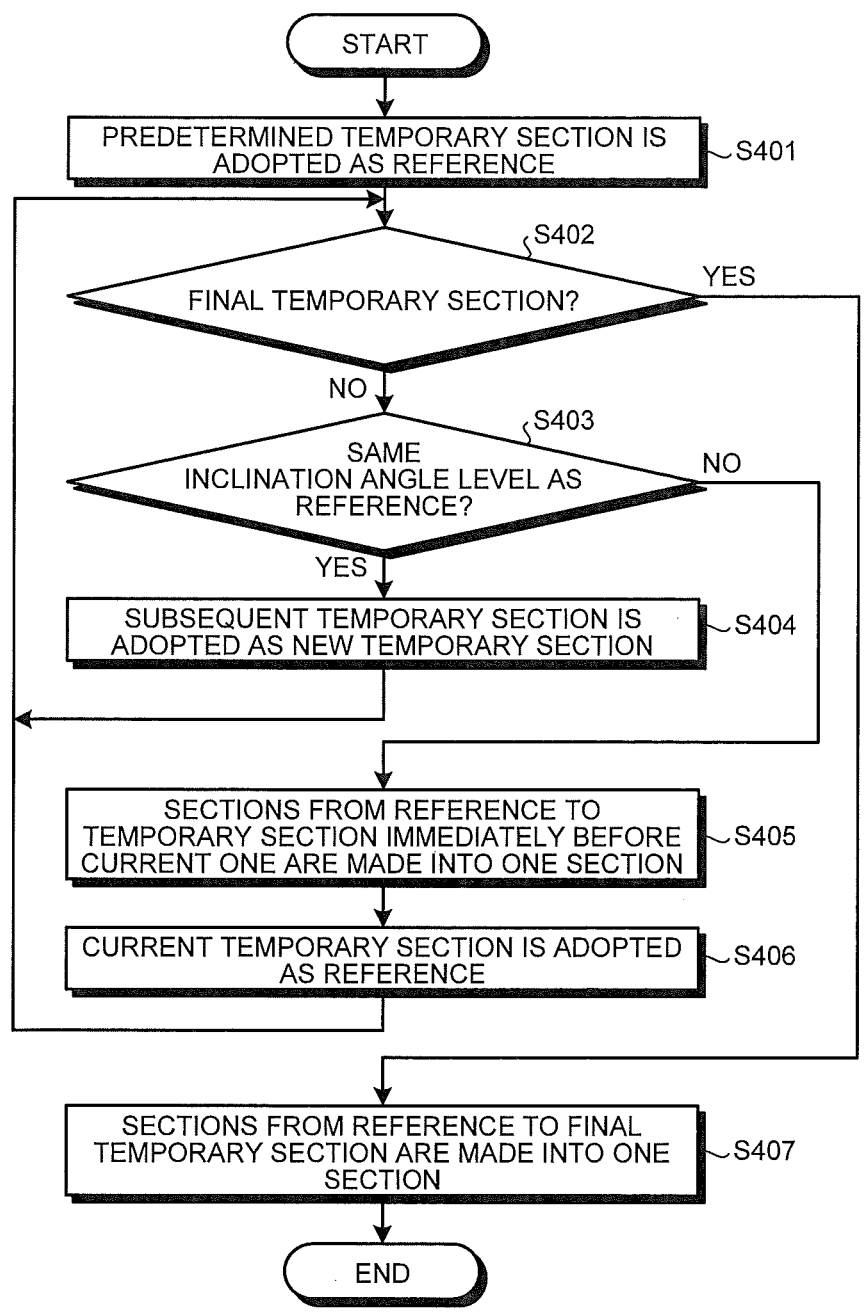
FIG. 16 is a flowchart illustrating a procedure of route analysis.
Figure 17:
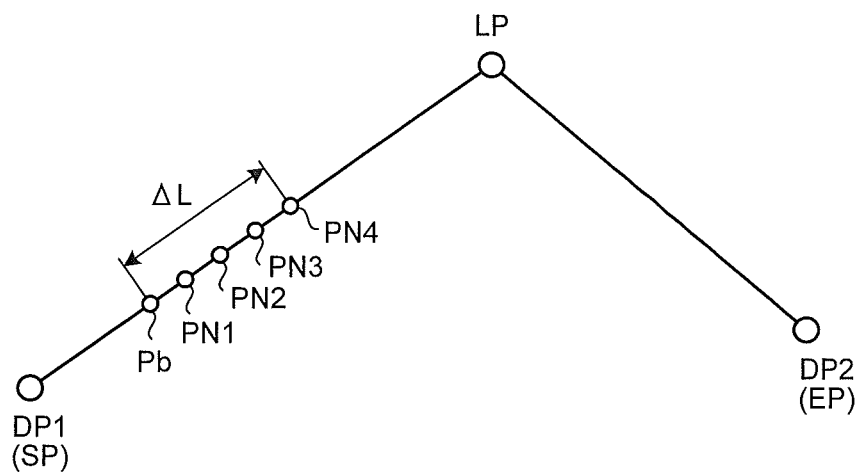
FIG. 17 is an explanatory diagram illustrating of route analysis.
Figure 18:
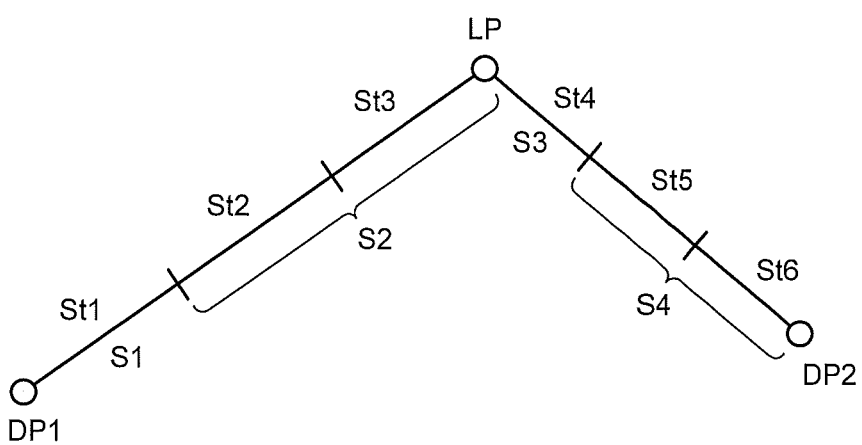
FIG. 18 is an explanatory diagram illustrating of route analysis.
Figure 19:
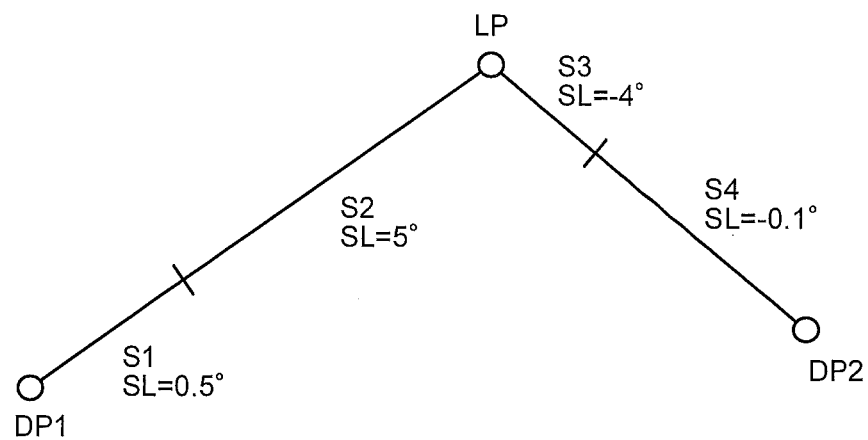
FIG. 19 is an explanatory diagram illustrating of route analysis.

FIGS. 15, 16 are flowcharts illustrating a procedure of route analysis. FIGS. 17 to 19 are explanatory diagrams illustrating of the route analysis. Dividing the identified route in accordance with the slopes is important information when the operation information collected from the dump truck 20 is analyzed. For example, the average vehicle speed in an ascending section of the identified route can be derived. In the route analysis, the average inclination angle of a section of a certain distance is obtained and adopted as a temporary section, and based on this temporary section, the identified route is divided into multiple sections in accordance with the slopes.

When the route analysis is executed, first, a temporary section is obtained from the average inclination angle of a section of a certain distance The slope analysis unit 12b reads information about the route on which the route analysis is executed (route information) from the route list 14R of the management-side storage device 13. This route information is non-compressed original data collected by the in-vehicle information collection device 30. In step S301, the slope analysis unit 12b adopts a predetermined position as a reference point from among the read route information. In the present embodiment, the position Pb as illustrated in FIG. 17 is adopted as a reference position. When the route analysis is started, the initial position SP is preferably a predetermined position.

Step S302 is performed, and when it is determined that the predetermined position is not the final position EP (step S302, No), step S303 is subsequently performed. In step S303, when the predetermined position is determined not to be a branching/crossing point position (step S303, No), step S304 is subsequently performed. In step S304, the slope analysis unit 12b adopts a subsequent position as a target for identifying a section of a certain distance. In this example, the position PN1 as illustrated in FIG. 17 is the "subsequent position". Step S305 is performed, and when it is determined the subsequent position PN1 is not away from the reference position Pb by a defined distance ΔL (for example, about 20 m to 100 m) or more (step S305, No), then the slope analysis unit 12b returns back to step S302 to execute the subsequent procedure.

Suppose that, when the slope analysis unit 12b repeats steps S302 to S305, the position PN4 is away from the reference position Pb by the defined distance ΔL or more (step S305, Yes). In this case, step S306 is performed, and the inclination angle from the reference position Pb to the current position PN4 is averaged. The information about the inclination angle is obtained from the inclination sensor 39 with timing when the in-vehicle information collection device 30 obtains the position information. The information about the inclination angle is described in association with the position information about the route of the route list 14R stored in the management-side storage device 13. Therefore, the slope analysis unit 12b can obtain information about the inclination angle from the information about the route which is to be subjected to the route analysis from the route list 14R of the management-side storage device 13.

Subsequently, step S307 is performed, and the slope analysis unit 12b adds the mean value of the inclination angle obtained in step S306 to the section of the defined distance ΔL. Then, the slope analysis unit 12b makes the section of the defined distance ΔL including the reference position Pb and the positions PN1, PN2, PN3, PN4 into one temporary section. Thereafter, step S308 is performed, and the slope analysis unit 12b adopts the subsequent position of the temporary section as the reference position, and thereafter returns back to step S302, and step S302 to step S308 are repeated until the target position for identifying the section of the certain distance becomes the final position EP.

Subsequently, back to step S303, explanation will be made. In step S303, when the predetermined position is determined to be a branching/crossing point position (step S303, Yes), step S306 is performed, and the slope analysis unit 12b averages the inclination angle from the reference position Pb to the branching/crossing point position. Thereafter, step S307 is performed, and the slope analysis unit 12b adds the mean value of the inclination angle obtained in step S306 to the section extending from the reference position Pb to the branching/crossing point position. Then, the slope analysis unit 12b makes one section including the position information extending from the reference position Pb to the branching/crossing point position into one temporary section. Thereafter, step S308 is performed, and the slope analysis unit 12b adopts the subsequent position of the temporary section as the reference position, and thereafter, step S302 to step S308 are repeated until the target position for identifying the section of the certain distance becomes the final position EP.

The position information about the crossing point and the branching point is prepared in advance by inputting, into the management device 10, the position information obtained from other means (portable GPS device, survey, or reading from travel path design diagram). Alternatively, the slope analysis unit 12b automatically detects the position information about the crossing point and the branching point from the information described in the route list 14R. The crossing point or branching point can be automatically detected by causing the slope analysis unit 12b to detect crossing of lines when all the routes in the mine are overlaid. The crossing of lines can be automatically detected as follows. When the slope analysis unit 12b compares multiple routes to search overlapping portions (close points), and finds end points, which are the branching points or crossing points, and therefore, they can be automatically detected.

Subsequently, back to step S302, explanation will be made. When the predetermined position is the final position EP as illustrated in FIG. 17 (step S302, Yes), step S309 is performed, and the slope analysis unit 12b averages the inclination angle from the reference position to the current final position EP. Subsequently, step S310 is performed, and the slope analysis unit 12h adds the mean value of the inclination angle obtained in step S309 to the section of the defined distance ΔL. Then, the slope analysis unit 12b makes one section including the position information extending from the reference position to the final position EP into one temporary section. The route identified with the processing explained above is divided into six temporary sections as illustrated in St1 to St6 in FIG. 18.

Subsequently, the identified route is divided into multiple sections based on the temporary sections St1 to St6. In step S401, the slope analysis unit 12b uses the predetermined temporary section. When the processing is started, the first temporary section St1 is adopted as the reference. Subsequently, in step S402, when the reference is not the final temporary section in the identified route (step S402, No), step S403 is subsequently performed.

In step S403, when the current temporary section has an inclination angle equivalent to the reference (step S403, Yes), step S404 is subsequently performed. When the temporary section St1 is adopted as the reference, the reference is the temporary section St1 and therefore the inclination angle is of the same magnitude in step S403. In step S404, the slope analysis unit 12b adopts the subsequent temporary section as a new temporary section. When step S404 is executed first, the temporary section St2 becomes the subsequent temporary section. Thereafter, step S402 is subsequently performed, and the slope analysis unit 12b executes the procedure below. As a result, when step S403 is performed for the second time or more, a temporary section other than the reference is compared in step S403. For example, when step S403 is performed for the second time, the temporary section St2 as illustrated in FIG. 18 and the reference (the temporary section St adopted as the reference in step S401) are compared.

In step S403, when the current temporary section does not have an inclination angle equivalent to the reference (step S403, No), step S405 is subsequently performed. In step S405, the slope analysis unit 12b makes sections extending from the reference to the temporary section immediately before the current section into one section. For example, in the example as illustrated in FIG. 18, the temporary section St2 has an inclination angle level different from the temporary section (reference) St1 (step S403, No), and therefore, the temporary section St1 is made into one section S1.

Subsequently, step S406 is performed, and the slope analysis unit 12b adopts the current temporary section as a reference, and thereafter, step S402 is subsequently performed to execute the subsequent procedure. In the example as illustrated in FIG. 18, the current temporary section is the temporary section St2, and therefore, in step S406, the temporary section St2 is adopted as the reference, and the procedure of step S402 and subsequent steps is executed. Subsequently, back to step S402, explanation will be made.

In step S402, when the reference is the final temporary section in the identified route (step S402, Yes), step S407 is subsequently performed. In the example as illustrated in FIG. 18, the temporary section St6 is the final temporary section. In step S407, the slope analysis unit 12b makes the sections from the reference to the final temporary section into one section, and the route analysis is terminated. According to the route analysis, the identified route is divided into multiple sections of about the same slope. In the example as illustrated in FIGS. 18, 19, the route extending from the dumping position DP1 via the loading position LP to the dumping position DP2 is divided into four sections S1 to S4. In this example, the inclination angle SL of the section S1 is 0.5 degrees (almost flat), the inclination angle SL of the section S2 is 5 degrees (upslope), the inclination angle SL of the section S3 is −4 degrees (downslope), and the inclination angle SL of the section S4 is −0.1 degrees (almost flat).

The slope analysis unit 12b describes, in the route list 14R, the result of the route analysis, i.e., the slopes of the sections (inclination angles) in association with the position information of the identified route, and stores the result to the management-side storage device 13. The slope analysis unit 12b may divide the result of the route analysis into the sections represented in different colors, and display the result on the display device 16 as illustrated in FIG. 2, or output the result with the output device 19. As described above, the state of the slope of the route can easily be understood when, instead of precisely dividing the slope of the identified route, the slope of the identified route is divided with a certain range and is displayed on the display device 16 or output with the output device 19. Subsequently, a modification of the processing for identifying the route (route identifying processing) will be explained.

(First Modification of Route Identifying Processing)

In the example as described above, the management device 10 identifies the route of one cycle of the conveying work, using operation information in one cycle of the conveying work of the dump truck 20 collected by the in-vehicle information collection device 30 (mainly position information). In first modification, the in-vehicle information collection device 30 as illustrated in FIG. 4 identifies the route of one cycle of the conveying work. In this case, the in-vehicle information collection device 30 obtains, via the in-vehicle wireless communication device 27, the registered route from the route list 14R of the management-side storage device 13 of the management device 10 as illustrated in FIG. 2. Then, the in-vehicle information collection device 30 uses the operation information of one cycle of the conveying work and the obtained registered route to execute the processing for identifying the route explained above (route identifying processing), thus identifying the route of one cycle of the conveying work. As described above, not only the management device 10 but also the in-vehicle information collection device 30 can identify the route along which the dump truck 20 travels in one cycle of the conveying work.

(Second Modification of Route Identifying Processing)

Figure 20:
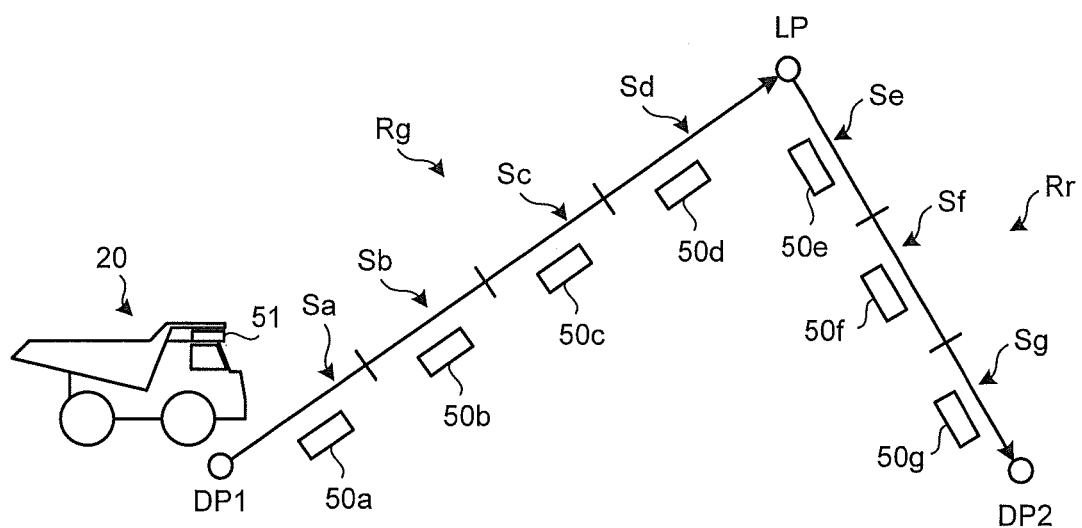
FIG. 20 is a figure for explaining a second modification of route identifying processing.

FIG. 20 is a figure for explaining the second modification of route identifying processing. FIG. 21 is a chart illustrating relationship of region ID, position information, and the like. In the present modification, identification bodies 50a to 50g for identifying predetermined regions of the routes are provided along routes Rg, Rr along which the dump truck 20 travels, and a reading device 51 provided in the dump truck 20 reads the identification bodies 50a to 50g, thus identifying the routes.

The routes Rg, Rr are divided into multiple sections Sa to Sg. Each of the sections Sa to Sg is provided with the identification bodies 50a to 50g having at least information about a region ID as an index for identifying it. The identification bodies 50a to 50g are preferably installed at road side of the route, so that the identification bodies 50a to 50g are not crushed by the wheels 23 of the dump truck 20. The identification bodies 50a to 50g are, for example, RFID (wireless IC tag). The dump truck 20 reads the regions ID of the identification bodies 50a to 50g with the reading device 51 while travelling the routes Rg, Rr. Then, for example, as illustrated in FIG. 21, the in-vehicle information collection device 30 stores the read region ID to the in-vehicle storage device 31 in association with operation information such as time, position information, vehicle speed and fuel consumption, and the like at the time when it is read. The regions ID are given in association with multiple routes of the mine, and the dump truck 20 can identify, with the region ID, the route along which the dump truck 20 travels in one cycle of the conveying work.

The identification bodies 50a to 50g are not limited to RFIDs. For example, reflection plates are installed at the section Sa to Sg of the routes Rg, Rr. Then, a reflection-type radar (object detection means) may be provided on the dump truck 20 as the reading device 51, and the dump truck 20 may travel while detecting the reflection plate, thus identifying the route along which the dump truck 20 travels.

The driver of the dump truck 20 may input, into the in-vehicle information collection device 30, the route along which the dump truck 20 travels in one cycle of the conveying work. In this case, for example, every time the route along which the dump truck 20 travels is changed, the driver selects (commands) a route with an input device and the like provided in the driving cab of the dump truck 20. The information about the selection (command) is stored by the in-vehicle information collection device 30 to the in-vehicle storage device 31 in association with operation information such as time, position information, vehicle speed and fuel consumption, and the like at the time when it is read. Further, the in-vehicle information collection device 30 adds the fuel consumption, the data, the amount of payload data, and the like in association with the route selected (commanded). By doing so, the route along which the dump truck 20 travels in one cycle of the conveying work can be identified. Subsequently, in the management method of the mining machine according to the present embodiment, an example of analyzing the operation information using the identified route will be explained.

<Analysis Example 1 of Operation Information Using Identified Route>

Figure 22:
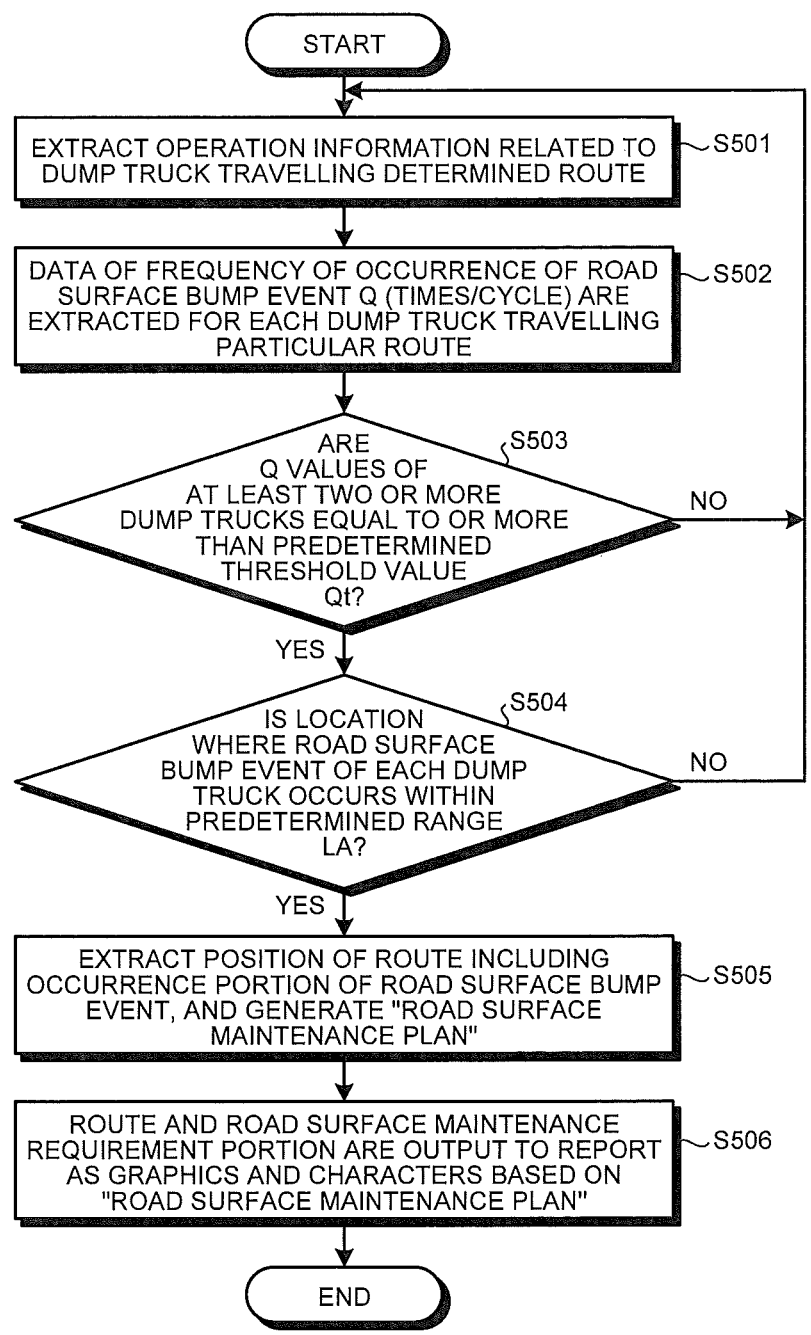
FIG. 22 is a flowchart illustrating an example for generating a road surface maintenance plan by analyzing operation information.
Figure 23:
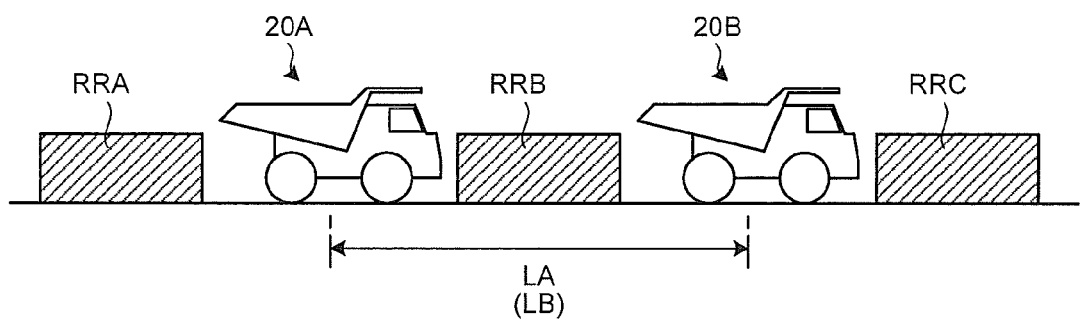
FIG. 23 is a figure used to explain analysis of operation information.

FIG. 22 is a flowchart illustrating an example for generating a road surface maintenance plan by analyzing operation information. FIG. 23 is a figure used to explain analysis of operation information. In this example, the state of the road surface of the route along which the dump truck 20 travels is analyzed from the operation information about the dump truck 20 travelled the same route from among the routes identified by the route identifying processing described above, and as necessary, a plan for maintaining the road surface is generated. An administrator or an operator of the mine can arrange and execute maintenance of the road surface of the road and the like in the mine upon receiving the plan of maintenance of the road surface. In the mine, the road surface is roughened by rainfall and the dump truck 20 travelling therein, and this generates bumps in the mine. When the bumps on the road surface increase, this may cause fatigue of the driver of the dump truck 20. The impact and the like generated when the dump truck 20 travels on the bumps causes stress on the vehicle body and the like, and this causes damage. Further, the tires of the wheels 23 slip at a location where the road surface is bumpy, and this may cause abrasion of the tires in a short time. Moreover, the slipping occurs and the dump truck 20 is forced to decelerate at a location where the road surface is bumpy, and therefore, the fuel consumption is degraded. Therefore, when the road surface becomes bumpy, the productivity of the mine can be maintained and improved by quickly detecting the bumps and repairing them. For example, a frequency of occurrence Q (time/one cycle) of road surface bump event per one dump truck 20 (corresponding to road surface information about bumps of the road surface) is calculated for every predetermined period (for example one day), and when it increases to a value equal to or more than a particular threshold value Qt, a road surface maintenance plan for planning maintenance of the road surface is generated as an index concerning maintenance of the road surface.

When the state of the road surface is analyzed, the road surface state analysis unit 12c of the management-side processing device 12 provided in the management device 10 as illustrated in FIG. 2 extracts the operation information about the dump truck 20 travelled along the determined route in step S501. Subsequently, in step S502, the road surface state analysis unit 12c extracts the data of the frequency of occurrence Q of the road surface bump event from the operation information about a plurality of dump trucks 20 travelled a particular route, i.e., the same route. The road surface bump event is counted when the dump truck 20 detects a bump larger than a predetermined value. A bump is detected as follows. For example, an acceleration sensor is provided, and the bump is detected from a signal indicating excessive change of acceleration detected by the acceleration sensor and excessive change of stroke of the suspension cylinder 24. The bumps of the road surface may be detected from excessive change of a detection signal of the pressure sensor 26. Further, an optical-type object detection device such as a radar may be provided, and laser may be emitted onto the road surface, and the dump truck 20 travels while detecting the bumps on the road surface, and the bumps may be detected by change of the reflection light of the laser. The frequency of occurrence Q is the number of times a bump event occurs per one cycle of the conveying work of the dump truck 20. The information about the road surface bump event is stored to the in-vehicle storage device 31 in association with the position information measured by the position information detection device 29 when the road surface bump event occurs.

In step S503, when Q values of at least two or more dump trucks 20 is determined to be less than a predetermined threshold value Qt (step S503, No), the road surface state analysis unit 12c returns back to step S501 to execute the subsequent procedure. When Q values of at least two or more dump trucks 20 are determined to be equal to or more than the predetermined threshold value Qt (step S503, Yes), step S504 is subsequently performed. In step S504, when a location where the road surface bump event of each dump truck 20 occurs (position information) is determined not to be within a predetermined range LA (about 50 m to 100 m) as illustrated in FIG. 23 (step S504, No), the road surface state analysis unit 12c returns back to step S501 to execute the subsequent procedure. When the location where the road surface bump event of each dump truck 20 occurs is determined to be within the predetermined range LA (step S504, Yes), step S505 is subsequently performed.

As illustrated in FIG. 23, as long as multiple dump trucks 20A, 20B travel along the same route, each dump truck 20A, 20B is likely to have the road surface bump event at the same location. However, depending on operation of the travel speed or the suspension cylinder 24, the indicated location where the detected road surface bump event occurs is expected to vary in each dump truck 20A, 20B. For example, the position where the dump truck 20A detects the road surface bump event may be relatively different from the position where the dump truck 20B detects the road surface bump event. Therefore, when the locations where the road surface bump event is detected by the dump trucks 20A, 20B are within the predetermined range LA, they are determined to be the road surface bump event at the same location in step S504 (there is a road surface bump at the same location which is to be repaired).

In step S505, the road surface state analysis unit 12c extracts the route where the road surface bump event occurs and the position thereof, based on the location where the road surface bump event occurs and the time when it occurs. Then, the road surface state analysis unit 12c generates a road surface maintenance plan as an index concerning maintenance of the road surface of the route where the bump event occurs. In this example, suppose that it is necessary to maintain the road surfaces of predetermined ranges RRA, RRB, RRC before and after the dump trucks 20A, 20B detecting the road surface bump events.

Thereafter, step S506 is performed, and the road surface state analysis unit 12c outputs routes that should be maintained and road surfaces that should be maintained to a report as graphic and characters based on the generated road surface maintenance plan. As described above, in this analysis example, the dump trucks 20 travelled the same route are compared with each other, and the accuracy of extraction of the portion of the road surface that should be maintained can be improved, and therefore, a plan of maintenance of the road surface suitable for the administrator or the operator of the mine can be made.

<Analysis Example 2 of Operation Information Using Identified Route>

Figure 24:
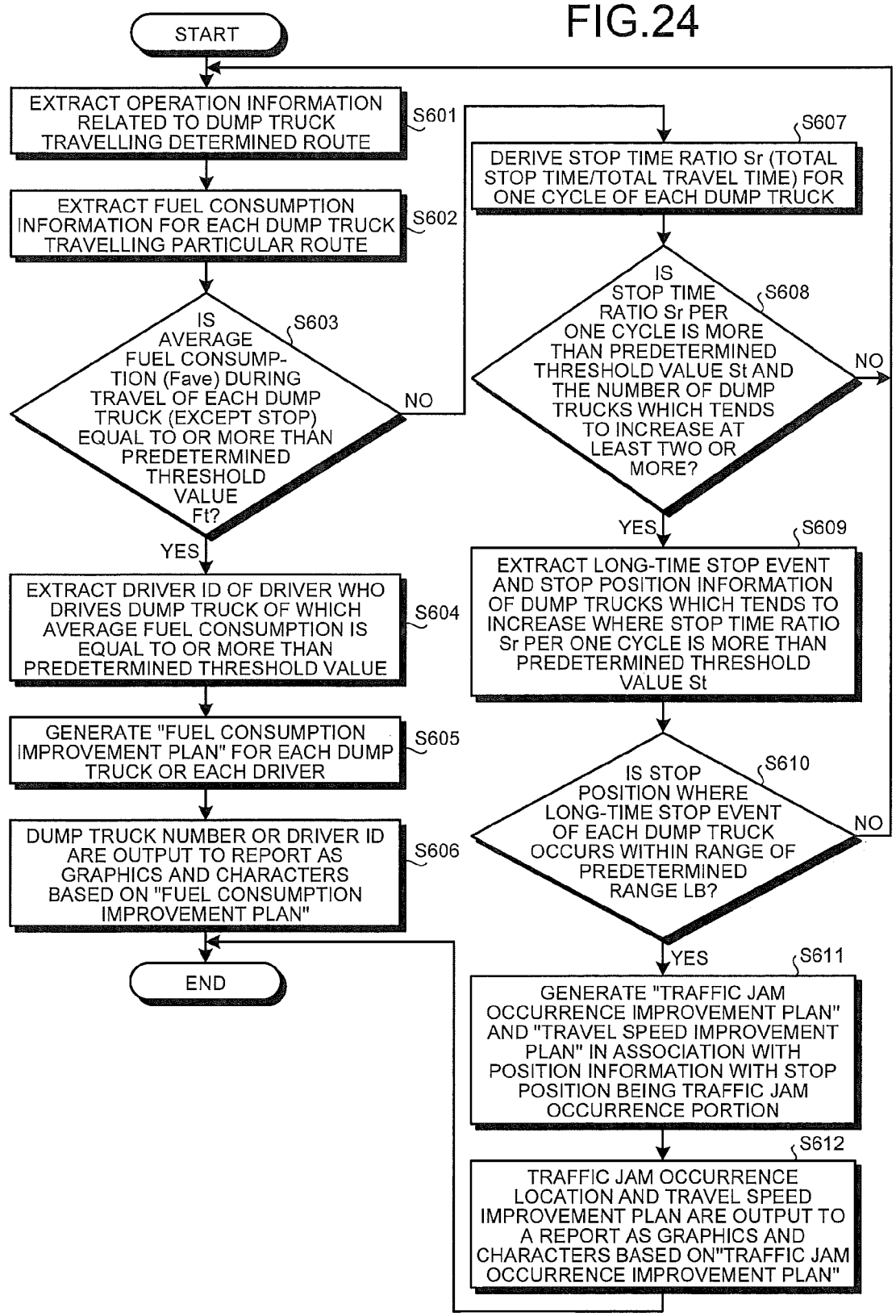
FIG. 24 is a flowchart illustrating an example for generating fuel consumption improvement plan or traffic jam improvement plan by analyzing operation information.

FIG. 24 is a flowchart illustrating an example for generating fuel consumption improvement plan or traffic jam improvement plan by analyzing operation information. In this example, traffic jam of the route and the fuel consumption of the dump truck 20 can be analyzed from the operation information about the dump truck 20 travelling the same route from among the identified routes, and as necessary, a plan for improving the travel speed of the dump truck at the traffic jam occurrence location or a plan for improving the fuel consumption are generated. The administrator, the operator, or the driver of the mine receives the plan for improving the travel speed of the dump truck 20 at the traffic jam occurrence location or the plan for improving the fuel consumption, so that, e.g., the design of the route and the like of the mine can be changed, the operation rule can be improved, and the driving education of the driver can be conducted. When the traffic jam occurs, the fuel consumption of the dump truck 20 is degraded, and this expedites abrasion of the brakes and abrasion of the tires, and such should be avoided in terms of safety such as collision, and this may reduce the productivity of the mine. In this example, the fuel consumption means the amount of fuel required to travel a predetermined distance.

When the fuel consumption and the like of the dump truck 20 are analyzed, the fuel consumption analysis unit 12d of the management-side processing device 12 provided in the management device 10 as illustrated in FIG. 2 extracts the operation information about the dump truck 20 travelling the determined route in step S601. Subsequently, in step S602, the fuel consumption analysis unit 12d extracts the fuel consumption information about the fuel consumption during travel from the operation information of the multiple dump trucks 20 travelling a particular route, i.e., the same route. The fuel consumption information has at least instantaneous fuel consumption. The fuel consumption analysis unit 12d can obtain the average fuel consumption during the predetermined period based on the instantaneous fuel consumption, and therefore, average fuel consumption Fave during travel can be obtained.

Subsequently, in step S603, when the average fuel consumption Fave during travel of each dump truck 20 except when the dump truck 20 is at a stop is determined to be equal to or more than a predetermined threshold value Ft (step S603, Yes), step S604 is subsequently performed. In step S604, the fuel consumption analysis unit 12d extracts the driver ID of the driver who drives the dump truck 20 of which average fuel consumption Fave is equal to or more than a predetermined threshold value. The driver ID can be extracted from the driver ID acquisition device 38 as illustrated in FIG. 4.

Subsequently, in step S605, the fuel consumption analysis unit 12d generates the fuel consumption improvement plan as an index concerning the fuel consumption, corresponding to the dump truck 20 or the driver of which average fuel consumption Fave is determined to be equal to or more than the predetermined threshold value. Then, in step S606, the number of the dump truck 20 or the driver ID is output to a report as graphic and characters based on the generated fuel consumption improvement plan. As described above, in this analysis example, the dump trucks 20 travelling the same route are compared with each other, and the accuracy of extraction of the driver or the dump truck 20 which is required to improve the fuel consumption can be improved, and therefore, a plan of fuel consumption improvement suitable for the administrator, the operator or the driver of the mine can be made.

Subsequently, back to step S603, explanation will be made. When the average fuel consumption Fave during travel of each dump truck 20 except when the dump truck 20 is at a stop is determined to be less than the predetermined threshold value Ft (step S603, No), step S607 is subsequently performed. In step S607, the traffic jam analysis unit 12e of the management-side processing device 12 provided in the management device 10 as illustrated in FIG. 2 obtains a stop time ratio Sr per one cycle of the conveying work of each dump truck 20. The stop time ratio Sr is obtained by dividing the summation of the stop time of the dump truck 20 per one cycle by the summation of the travel time per one cycle.

Step S608 is performed, and when the stop time ratio Sr per one cycle of the conveying work is more than the predetermined threshold value St, and when the number of dump trucks 20 which tends to increase is determined to be two or less (step S608, No), the analysis of the operation information is terminated. The stop time ratio Sr per one cycle of the conveying work is determined to be more than a predetermined threshold value St, and when the number of dump trucks 20 which tends to increase is determined to be two or less (step S608, Yes), step S609 is subsequently performed. In step S609, the traffic jam analysis unit 12e extracts a long-time stop (stop for a predetermined time or more) event and stop position data (position information) of the dump trucks 20 of which stop time ratio Sr per one cycle is more than a predetermined threshold value St and tends to increase. The long-time stop event is information indicating a long-time stop event generated as follows: after a sensor and the like detecting the vehicle speed of the speed sensor 25 and the like outputs a signal indicating stop, an elapsed time is measured with a timer IC and the like, and the dump truck 20 is determined to be at a stop for a predetermined time or more, and in such case, the long-time stop event occurs.

Subsequently, in step S610, when the stop position where the long-time stop event of each dump truck 20A, 20B occurs as illustrated in FIG. 23 is not within a range of a predetermined range LB (about 30 m to 50 m) (step S610, No), the analysis of the operation information is terminated. When the stop position where the long-time stop event of each dump truck 20A, 20B occurs is not within a range of a predetermined range LB (about 30 m to 50 m) (step S610, Yes), step S611 is subsequently performed. In step S611, the traffic jam analysis unit 12e generates a traffic jam occurrence improvement plan in association with position information of route, with the stop position of the dump truck 20 being a traffic jam occurrence portion. The traffic jam analysis unit 12e generates an index concerning improvement of the travel speed of the dump truck 20 (travel speed improvement plan).

For example, suppose that, in the example as illustrated in FIG. 23, the dump truck 20B causes a long-time stop event the earliest in a day. In this case, the traffic jam analysis unit 12e incorporates, into the travel speed improvement plan, information indicating that limitation of the travel speed in the predetermined ranges RRA, RRB after the position where the dump truck 20B stops for a long time is reduced. By doing so, the number of times the dump truck 20 brakes and starts to move is reduced, so that this can reduce occurrence of traffic jam, reduce the fuel consumption, suppress wear of the brakes, suppress abrasion of the tires, or ensure the safety, and the productivity of the mine can be maintained and improved.

Subsequently, in step S612, the traffic jam analysis unit 12e outputs the traffic jam occurrence location and the travel speed improvement plan based on the generated traffic jam occurrence improvement plan to a report as graphic and characters. As described above, in this analysis example, the dump trucks 20 travelling the same route are compared with each other, and the accuracy of information for improving the travel speed of the dump truck 20 and information about locations where improvement of traffic jam is required can be improved, and therefore, appropriate index for improvement of traffic jam occurrence can be provided. As a result, the frequency of occurrence of traffic jam can be reduced, and therefore, the reduction of the productivity of the mine can be reduced to the minimum. The administrator or the operator of the mine can improve the operation rule concerning the limitation of the travel speed and give warning concerning limitation of the travel speed to the driver.

<Analysis Example 3 of Operation Information Using Identified Route>

Figure 25:
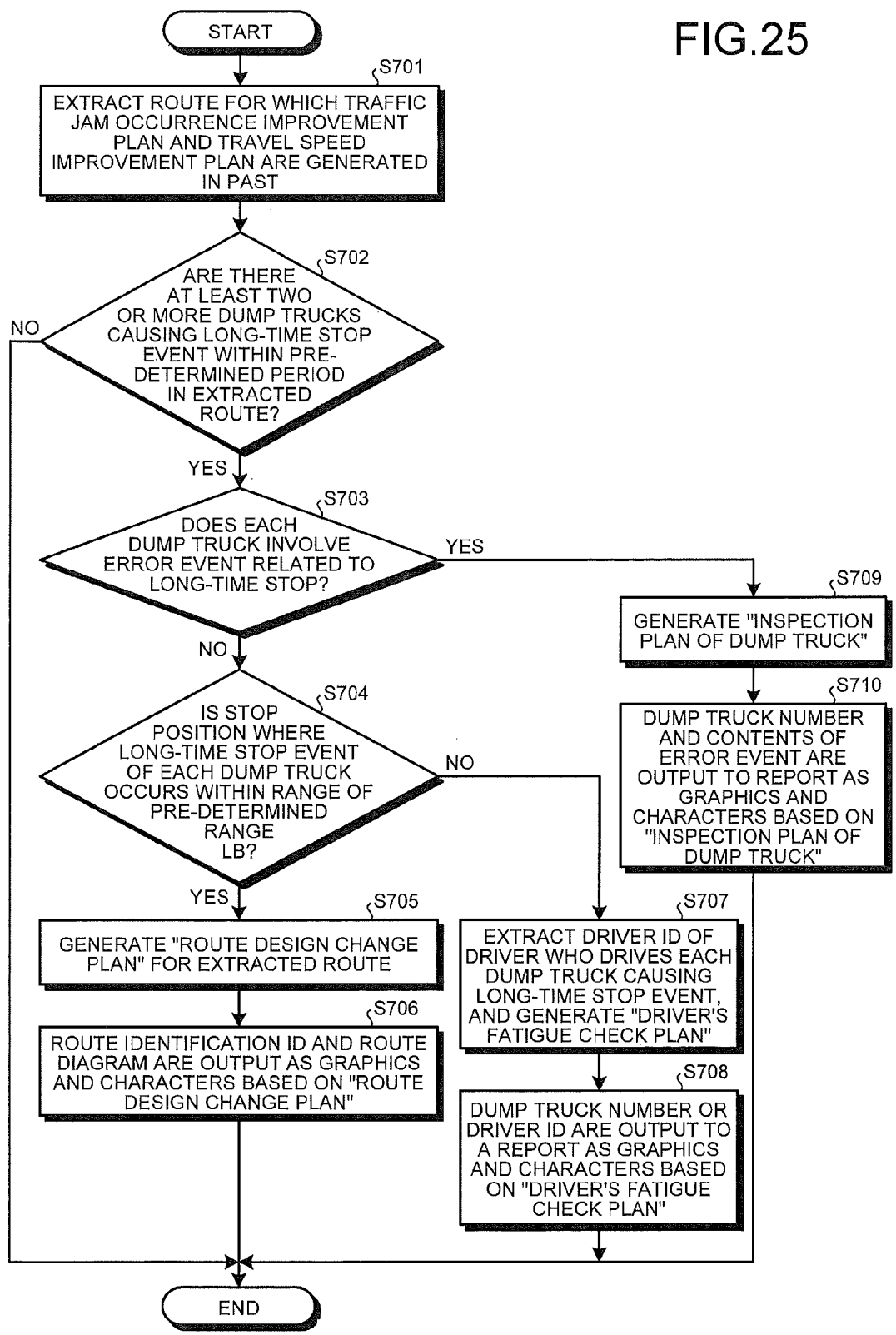
FIG. 25 is a flowchart illustrating an example for generating route change plan, driver's fatigue check plan, or inspection plan by analyzing operation information.

FIG. 25 is a flowchart illustrating an example for generating route change plan, driver's fatigue check plan, or inspection plan for analyzing operation information. In this example, as necessary, an inspection plan as an index concerning inspection of the dump truck 20, the driver's fatigue check plan as a fatigue check index, or an route change plan as a route change index is generated from the operation information about the dump truck 20 travelling the same route among the routes for which the traffic jam occurrence improvement plan and the travel speed improvement plan are generated in the analysis example 2 as explained above. Subsequently, procedure of analysis example 3 of the operation information will be explained.

In step S701, the travel route analysis unit 12f of the management-side processing device 12 provided in the management device 10 as illustrated in FIG. 2 extracts the route for which the traffic jam occurrence improvement plan and the travel speed improvement plan are generated. When they are generated, information about the corresponding route is attached with history of generation thereof, and accordingly, the travel route analysis unit 12f can extract the route for which traffic jam occurrence improvement plan and travel speed improvement plan are generated with the history.

Then, step S702 is subsequently performed, and when it is determined that, in the extracted route, the number of dump trucks 20 causing long-time stop event in a predetermined period is less than two (step S702, No), the analysis of the operation information is terminated. When it is determined that the number of dump trucks 20 causing long-time stop event in a predetermined period is at least equal to or more than two (step S702, Yes), step S703 is subsequently performed. In step S703, when each dump truck 20 causing long-time stop event is determined to cause no error event (occurrence of abnormality) (step S703, No), step S704 is subsequently performed. The error event corresponds to abnormality information about abnormality of the dump truck 20. The error event is information generated when the in-vehicle information collection device 30 obtains signals transmitted from sensors and the like attached to portions of the dump truck 20 to determine absence/presence of abnormality and when the abnormality is determined to occur or information generated when the in-vehicle information collection device 30 obtains a signal indicating abnormality when sensors and the like detect abnormality. For example, the abnormality of the dump truck 20 includes, e.g., abnormality of an engine water temperature of the engine 34G (excessively increased temperature state) and abnormality of battery (abnormality of voltage and charge circuit).

In step S704, when the stop position of each dump truck 20 causing long-time stop event is determined to be within the predetermined range LB (see FIG. 23) (step S704, Yes), step S705 is subsequently performed. In step S705, the travel route analysis unit 12f generates a route design change plan as a route change index for the route extracted in step S701. More specifically, when improvement plan of the travel speed for improving the traffic jam, and when the dump truck 20 stops for a long time regardless of occurrence of abnormality, this means may be determined that there is a margin for improving the design of the route along which the dump truck 20 travels.

Subsequently, step S706 is performed, and the travel route analysis unit 12f outputs, a route identification ID for identifying a route and a drawing of a route corresponding to the route identification ID as graphics or characters based on the route design change plan. As described above, in this analysis example, based on the long-time stop information about stop, for the predetermined time or more, of the dump trucks 20 travelling the same route as the route for which the travel speed improvement plan is previously generated, routes of which design concerning the design of the route such as the length of the route, the arrangement of the route, arrangement positions of crossing points and branching points should be changed are extracted. Accordingly, in this analysis example, the accuracy of extraction of routes of which designs need to be changed can be improved, and therefore, an appropriate plan of design change of the routes can be made. As a result, the administrator or the operator of the mine can quickly improve the route of which design needs to be changed, and therefore, the reduction of the productivity of the mine can be reduced to the minimum.

Subsequently, back to step S704, explanation will be made. When the stop position of each dump truck 20 causing long-time stop event is determined to be out of the predetermined range LB (see FIG. 23) (step S704, No), step S707 is subsequently performed. In step S707, the driver state analysis unit 12g of the management-side processing device 12 of the management device 10 as illustrated in FIG. 2 extracts the driver ID of the driver who drives each dump truck 20 causing the long-time stop event, and generates a driver's fatigue check plan as a fatigue check index about the driver's attendance state. In the case where "negative" (No) is determined in step S704, the dump truck 20 causes no abnormality, and the multiple dump trucks 20 can be determined to stop for a long period of time. In such case, the driver may be taking a rest more than necessary, or the driver is in band condition, and therefore, it is determined that it may be necessary to check the condition of the driver or the attendance state (management of the attendance state), and the driver state analysis unit 12g generates a driver's fatigue check plan in step S707.

Subsequently, step S708 is performed, and the driver state analysis unit 12g outputs the number of the dump truck 20 or the driver ID to a report as graphic and characters, based on the generated driver's fatigue check plan. As described above, in this analysis example, the driver's fatigue check plan based on the long-time stop position information about the position where the dump trucks 20 travelling the route stop for a long period of time equal to or more than a predetermined time. As a result, the accuracy of extraction of the driver whose health condition is to be checked and the driver whose attendance state is to be checked can be improved. The administrator or the operator of the mine can improve management of the driver's attendance state, improve operation in the mine, and ensure safety and improve maintenance of productivity of the mine.

Subsequently, back to step S703, explanation will be made. Each dump truck 20 causing long-time stop event causes error event (occurrence of abnormality) (step S703, Yes), step S709 is subsequently performed. In step S709, the abnormality analysis unit 12h of the management-side processing device 12 of the management device 10 as illustrated in FIG. 2 generates an inspection plan about the dump truck 20 causing the error event. More specifically, in the case where "positive" (Yes) is determined in step S703, the dump truck 20 causes abnormality, and as a result, the dump truck 20 is determined to be at a stop for a long period of time, and therefore, it can be determined that the inspection or repairing of the dump truck 20 is highly required.

Subsequently, step S710 is performed, and the abnormality analysis unit 12h outputs the number of the dump truck 20 and the contents of the error event to a report as graphic and characters, based on the generated inspection plan. As described above, in this analysis example, the inspection plan of the dump truck 20 is generated based on the abnormality information about abnormality and long-time stop for a period of time equal to or more than a predetermined time concerning the dump trucks 20 travelling the same route as the route. For this reason, the accuracy of extraction of abnormality of the dump truck 20 is improved, and therefore, the dump truck 20 causing abnormality can be quickly inspected, repaired, and recovered. As a result, the reduction of the productivity of the mine can be reduced to the minimum. The administrator or the operator of the mine can repair each dump truck 20 upon receiving the inspection plan, and can make preventive maintenance or an operation plan of the mine.

<Analysis Example 4 of Operation Information Using Identified Route>

Figure 26:
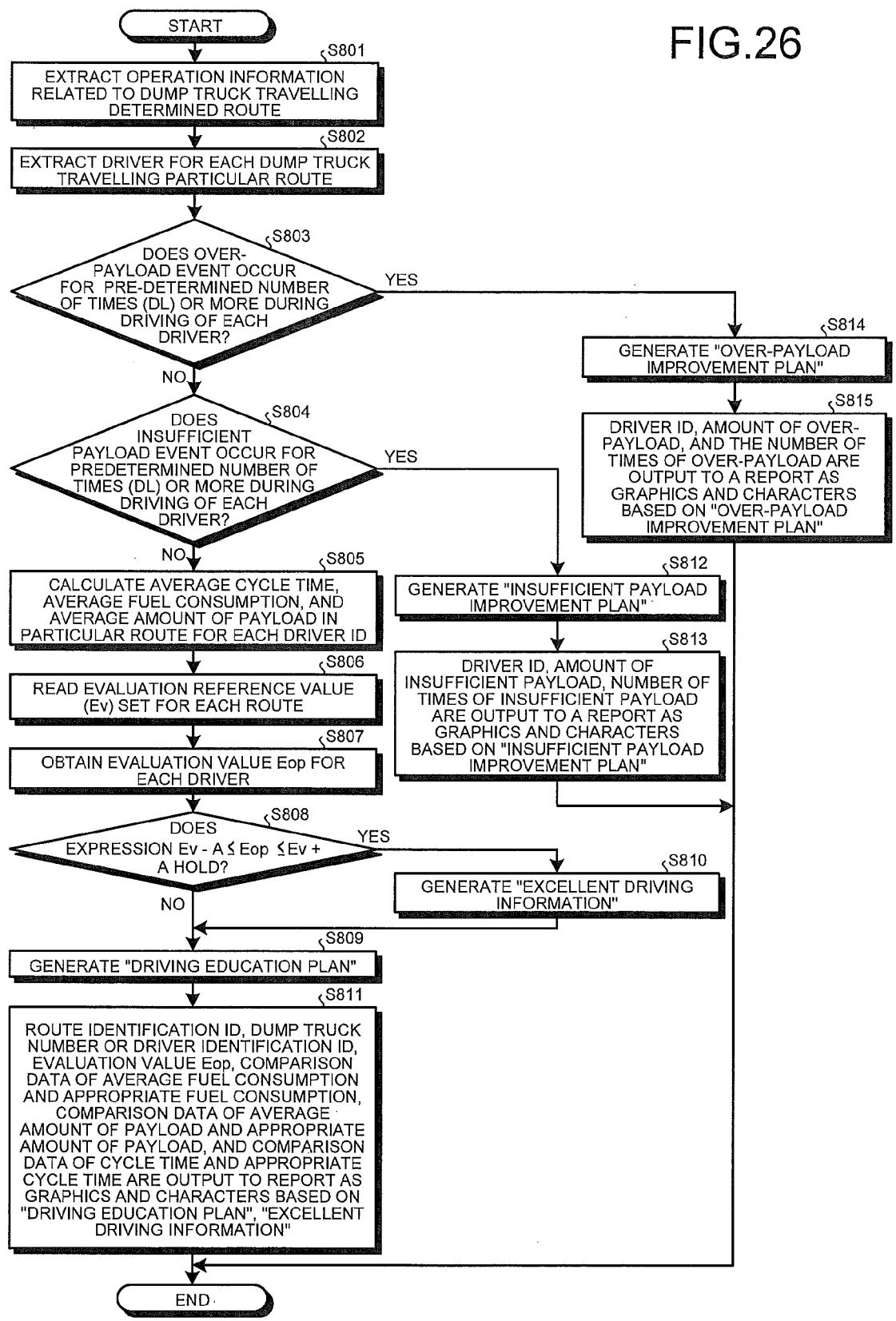
FIG. 26 is a flowchart illustrating an example for generating driving education index or payload improvement request index by analyzing operation information.
Figures 27, 28:
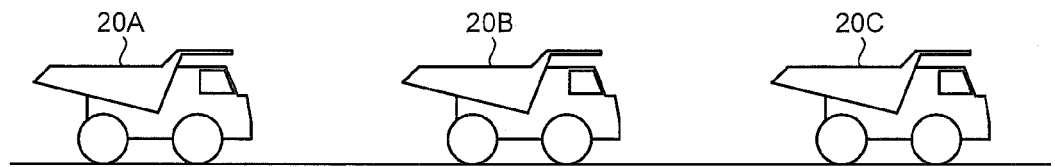
FIG. 27 is a figure illustrating a plurality of dump trucks operating in a mine.
FIG. 28 is a chart illustrating a route and a driver of the dump truck as illustrated in FIG. 27.

FIG. 26 is a flowchart illustrating an example for generating driving education index or payload improvement request index by analyzing operation information. FIG. 27 is a figure illustrating the plurality of dump trucks 20 (20A, 20B, 20C) operating in the mine. FIG. 28 is a chart illustrating a route and a driver of the dump truck 20 (20A, 20B, 20C) as illustrated in FIG. 27. In this example, a driving education index for improving the driver's skill and a payload improvement request index for requesting improvement of over-payload or insufficient payload are generated, as necessary, from the operation information about the dump truck 20 travelling the same route. Subsequently, procedure of analysis example 4 of the operation information will be explained.

When the analysis example 4 of the operation information is executed, the driving analysis unit 12i of the management-side processing device 12 of the management device 10 as illustrated in FIG. 2 extracts the operation information about the dump truck 20 travelling the same route in step S801. Subsequently, in step S802, the driving analysis unit 12i extracts the driver from a particular route, i.e., the operation information of the multiple dump trucks 20 travelling the same route.

As illustrated in FIG. 27, multiple dump trucks 20A, 20B, 20C operate in the mine. In the mine, one driver may drive multiple dump truck. For example, as illustrated in FIG. 28, the driver A drives the dump trucks 20A, 20B. In the mine, one driver may drive along multiple routes. For example, each of the drivers A, B, D drives along multiple routes. Further, all the dump truck 20A, 20B, 20C do not necessarily travel the same route. For example, in the example as illustrated in FIG. 28, none of the dump truck 20A, 20B, 20C travels all of the routes R1, R2, R3, R4. When a driving education index for the driver is generated from the operation information, it is necessary to extract information about the same driver. Accordingly, in step S802, the driving analysis unit 12i extracts a driver.

Subsequently, in step S803, when it is determined that, during driving of each driver, over-payload event (a payload amount information) does not occur for a predetermined number of times OL or more (step S803, No), step S804 is subsequently performed. In step S804, when it is determined that, during driving of each driver, insufficient payload event (a payload amount information) does not occur for a predetermined number of times DL or more (step S804, No), step S805 is subsequently performed. In this case, information about over-payload event or insufficient payload event is generated as follows. In accordance with the class and the type of the dump truck 20 or operation rules of the mine, an appropriate amount of payload, serving as an index with which whether the amount of payload is over-payload or insufficient payload is determined, is set in advance and stored to the in-vehicle storage device 3. The amount of payload is measured with the pressure sensor 26 as described above, and therefore, the in-vehicle information collection device 30 compares the measured amount of payload with an appropriate amount of payload to determine whether the measured amount of payload is too much or not. When the in-vehicle information collection device 30 determines that the measured amount of payload is too much, the in-vehicle information collection device 30 generates information about over-payload event. When the in-vehicle information collection device 30 determines that the measured amount of payload is too little, the in-vehicle information collection device 30 generates information about insufficient payload event. The over-payload event or insufficient payload event thus generated is stored to the in-vehicle storage device 31. The appropriate amount of payload will be explained later in detail. In step S805, the driving analysis unit 12i calculates, for each driver ID, the average cycle time of the route in step S802 (time from finish of unloading to when the load is loaded and unloaded), the average fuel consumption (fuel consumption information), and the average amount of payload (a payload amount information) based on the operation information.

Subsequently, step S806 is performed, and the driving analysis unit 12i reads the evaluation reference value Ev set for each route from the management-side storage device 13. The evaluation reference value Ev is obtained by adding the appropriate fuel consumption, the appropriate amount of payload, and the appropriate cycle time. The appropriate amount of payload is preferably the maximum amount of payload determined based on the class or the type of the dump truck 20 determined in terms of design for the possibility of abnormal consumption or abrasion due to the load exerted on the brakes and the tires or excessive load exerted on the vehicle body and the like by over-payload on the dump truck 20. When the productivity of the mine is considered, insufficient payload may reduce the productivity, and the amount of payload (insufficient the amount of payload) which is considered to be the insufficient payload is determined, and an appropriate amount of payload may be set between the insufficient the amount of payload and the maximum the amount of payload. The evaluation reference value Ev is a value different according to the class or the type of the dump truck 20 or the route along which the dump truck 20 travels. Accordingly, the evaluation reference value Ev is a value obtained from simulation or actually causing the dump truck 20 to travel while carrying the load after the route along which the dump truck 20 travels is designed. Alternatively, multiple data are obtained during operation, and a value obtained as a mean value may be used as the evaluation reference value Ev. Subsequently, step S807 is performed, and the driving analysis unit 12i obtains an evaluation value Eop for each driver. Eop is obtained by adding the average fuel consumption, the average amount of payload, and the average cycle time.

In step S808, a tolerance is set as A, and when the evaluation value Eop is determined to not to be in a range where the tolerance A is taken into consideration of the evaluation reference value Ev (Ev−A Eop Ev+A does not hold) (step S808, No), step S809 is performed, and the driving analysis unit 12i generates a driving education plan serving as a driving education index for requesting improvement of driver's driving skill. More specifically, when the evaluation value Eop is determined to be out of the evaluation reference value Ev even when the tolerance A is considered, it is determined that there is a margin for improving the driver's driving skill. On the other hand, when Ev−A Eop Ev+A is determined to hold (step S808, Yes), step S810 is performed, and the driving analysis unit 12i generates an excellent driving information.

Subsequently, in step S811, the driving analysis unit 12i outputs, to a report as graphic and characters, the route identification ID, the dump truck number or the driver ID, the evaluation value Eop, comparison data of the average fuel consumption and the appropriate fuel consumption, comparison data of the average amount of payload and the appropriate amount of payload, and comparison data of the average cycle time and the appropriate cycle time, based on the driving education plan or the excellent driving information. As described above, in this analysis example, by evaluating the same driver concerning the dump truck 20 travelling the same route, the accuracy for extracting the driver who needs to improve the driving skill can be improved. Therefore, in this analysis example, the driving education plan can be provided. As a result, the driver's driving skill can be improved, and this can suppress damage of the vehicle body 21 and the like caused by over-payload and wear of the brakes, suppress abrasion of the tires, and ensure the safety of the dump truck 20 based on stopping at an appropriate braking distance, and further can reduce the fuel consumption, thus reducing the decrease of productivity of the mine to the minimum level. The administrator or the operator of the mine receives the driving education plan, and conduct educational guidance to the driver, such as prevention of driving- with over-payload or insufficient payload or prevention of driving with bad effects on the fuel consumption. Alternatively, the driver may directly receive the driving education plan, and may improve the driving.

It should be noted that the evaluation reference value Ev may be determined according to a method described below. In the above explanation, the evaluation reference value Ev is a simple summation of the appropriate fuel consumption, the appropriate amount of payload, and the appropriate cycle time, but depending on the way of thinking of operation of the mine, or the plan of operation of the mine (production planning), the degree of importance (weight) of these three elements may be difference. For example, a low degree of importance may be given to the fuel consumption of the dump truck 20, and it may be desired to ensure a high yield (the amount of payload is desired to be increased). Accordingly, for the three elements, weight coefficients a ($a_1$, $a_2$, $a_3$) are added, and the summation is adopted as an evaluation reference value Ev'. More specifically, the evaluation reference value E is derived from the following expression: Ev'=$a_1$×(1/appropriate fuel consumption)+$a_2$×the appropriate amount of payload+$a_3$×(1/appropriate cycle time), and the evaluation reference value Ev is set in advance. According to such expression, while three elements (the appropriate fuel consumption, the appropriate amount of payload, and the appropriate cycle time) are fixed, the weight coefficients a ($a_1$, $a_2$, $a_3$) are changed in accordance with the way of thinking of operation of the mine or the plan, so that an appropriate driving education plan can be made. In the case of this method, the tolerance A is a value different from the tolerance A explained above, and is a tolerance A' according to the evaluation reference value Ev' of this method.

Subsequently, back to step S804, explanation will be made. When it is determined that, during driving of each driver, insufficient payload event occurs for a predetermined number of times DL or more (step S804, Yes), step S812 is subsequently performed. In step S812, the payload amount analysis unit 12j of the management-side processing device 12 of the management device 10 as illustrated in FIG. 2 generates an insufficient payload improvement plan as a payload improvement request index. Subsequently, step S813 is performed, and the payload amount analysis unit 12j outputs, to a report as graphic and characters, the driver ID (the driver ID of a driver who drives the loading machine 4 such as an excavator and an ID of a driver of the dump truck 20), the insufficient the amount of payload, and the number of times of insufficient payload, based on the insufficient payload improvement plan. The ID of the driver of the loading machine 4 is registered and stored in the management-side storage device 13 in advance, and associated with information about a particular route, so that the loading machine 4 involved with the loading work that is done in the particular route (the driver ID of the loading machine 4) can be extracted. Further, the loading machine 4 may include the reading device 51 explained above, and the read driver ID may be transmitted to the dump truck 20 involved with the loading work by means of wireless communication, and may be stored the in-vehicle storage device 31 via the in-vehicle wireless communication device 27 of the dump truck 20. In this case, the loading machine 4 involved with the loading work that is done in the particular route (the driver ID of the loading machine 4) can be extracted. By doing so, the driver can be prompted to improve the insufficient payload, and therefore, the reduction of the productivity of the mine can be reduced to the minimum level. When insufficient payload is carried frequently, the dump truck 20 frequently travels the route which in turn increases the fuel consumption, and therefore, the driver of the dump truck 20 or the loading machine 4 having received the insufficient payload improvement plan makes improvement to reduce the fuel consumption of the dump truck 20.

Subsequently, back to step S803, explanation will be made. When it is determined that, during driving of each driver, over-payload event occurs for a predetermined number of times OL or more (step S803, Yes), step S814 is subsequently performed. In step S814, the payload amount analysis unit 12j generates an over-payload improvement plan as a payload improvement request index. Subsequently, step S815 is performed, and the payload amount analysis unit 12j outputs, to a report as graphic and characters, the driver ID (the driver ID of a driver who drives the loading machine 4 such as an excavator and an ID of a driver of the dump truck 20), the insufficient the amount of payload, and the number of times of insufficient payload, based on the over-payload improvement plan. By doing so, the driver can be prompted to improve the over-payload, and therefore, this can prevent damage to the dump truck 20 and ensure safety.

Reference Signs List

1 Management system of mining machine (management system)
2 fuelling station
3 relaying device
4 excavator
5A, 5B, 5C GPS satellite
6 intermediate relaying device
7 communication range
10 management device
12 management-side processing device
12a travel route identifying unit
12b slope analysis unit
12c road surface state analysis unit
12d fuel consumption analysis unit
12e traffic jam analysis unit
12f travel route analysis unit
12g driver state analysis unit
12h abnormality analysis unit
12i driving analysis unit
12j payload amount analysis unit
13 management-side storage device
15 input/output unit
16 display device
17 input device
18 management-side wireless communication device
18A antenna
19 output device
20, 20A, 20B, 20C dump truck
21 vehicle main body
22 vessel
23 wheels
24 suspension cylinder
25 speed sensor
26 pressure sensor
27 in-vehicle wireless communication device
29 position information detection device
30 in-vehicle information collection device
31 in-vehicle storage device
32A engine control device
32B travel control device
32C oil pressure control device
33A accelerator
33B shift lever
33C dump lever
35 operating oil control valve
36 hoist cylinder
37 travel device
38 acquisition device
39 inclinometer (inclination sensor)
50a to 50g identification body
51 reading device

The invention claimed is:

1. A management system of a mining machine comprising:
an in-vehicle information collection device which is provided in a mining machine working in a mine and collects operation information about an operation state of the mining machine;
an in-vehicle wireless communication device provided in the mining machine to perform communication;
a management-side wireless communication device which communicates with the in-vehicle wireless communication device; and
a management device which collects the operation information via the in-vehicle wireless communication device and the management-side wireless communication device,
wherein the management device identifies a route along which the mining machine travels, based on a comparison between a single piece of position information of an intermediate position in a route along which the mining machine moves from a dumping position to a loading position and a single piece of position information of an intermediate position in a route along which the mining machine moves from the loading position to the dumping position extracted from multiple pieces of position information obtained by compressing the number of pieces of data of multiple pieces of position information at the dumping position, position information about the loading position, and position information between the dumping position and the loading position included in a route along which the mining machine moves from a location where the mining machine unloads a load, to a location where the mining machine loads a load, and to a location where the mining machine unloads the load again, included in the operation information, and position information about a designated route set in advance.

2. A management system of a mining machine comprising:
an in-vehicle information collection device which is provided in a mining machine working in a mine and collects operation information about an operation state of the mining machine;
an in-vehicle wireless communication device provided in the mining machine to perform communication;
a management-side wireless communication device which communicates with the in-vehicle wireless communication device; and
a management device which collects the operation information via the in-vehicle wireless communication device and the management-side wireless communication device,
wherein the in-vehicle information collection device identifies a route along which the mining machine travels, based on a comparison between a single piece of position information of an intermediate position in a route along which the mining machine moves from a dumping position to a loading position and a single piece of position information of an intermediate position in a route along which the mining machine moves from the loading position to the dumping position extracted from multiple pieces of position information obtained by compressing the number of pieces of data of multiple pieces of position information at the dumping position, position information about the loading position, and position information between the dumping position and the loading position included in a route along which the mining machine moves from a location where the mining machine unloads a load, to a location where the mining machine loads a load, and to a location where the mining machine unloads the load again, included in the operation information, and position information about a designated route set in advance, and wherein the in-vehicle wireless communication device transmits the identified route along which the mining machine travels to the management device.

3. The management system of the mining machine according to claim 2, wherein a pattern of the route along which the mining machine travels is identified based on the number of dumping positions and loading positions, and position information at two locations between the dumping position and the loading position, and position information at the dumping position, position information about the loading position and position information at the two locations between the dumping position and the loading position is extracted as a target position of the comparison according to the identified pattern of the route.

4. The management system of the mining machine according to claim 2, wherein when the route along which the mining machine travels is identified, numerical values of position information at multiple locations included in the route are rounded to compress the number of pieces of data of multiple pieces of position information.

5. The management system of the mining machine according to claim 2, further comprising a management-side storage device which stores the identified route along which the mining machine travels from which the operation information is collected and the operation information collected in association with each other.

6. The management system of the mining machine according to claim 2, wherein, when the operation information is analyzed, the management device extracts road surface information about a bump on a road surface from the operation information about a plurality of the mining machines travelling the same identified route to generate an index concerning maintenance of the road surface based on the extracted road surface information.

7. The management system of the mining machine according to claim 2, wherein, when the operation information is analyzed, the management device extracts fuel consumption information about fuel consumption during travel from the operation information about a plurality of the mining machines travelling the same identified route to generate an index concerning the fuel consumption based on the extracted fuel consumption information.

8. The management system of the mining machine according to claim 2, wherein, when the operation information is analyzed, the management device extracts a travel time and a stop time from the operation information about a plurality of the mining machines travelling the same identified route to generate an index concerning improvement of a travel speed of the mining machine, based on the travel time and the stop time extracted.

9. The management system of the mining machine according to claim 8, wherein, when the operation information is analyzed, the management device extracts long-time stop information about stop for a predetermined time or more and abnormality information about abnormality of the plurality of mining machines, from the operation information about a plurality of the mining machines travelling the route corresponding to the index concerning improvement of the travel speed to generate an index about inspection of the mining machine, based on the long-time stop information and the abnormality information extracted.

10. The management system of the mining machine according to claim 8, wherein, when the operation information is analyzed, the management device further extracts long-time stop position information about a position where stop for the predetermined time or more occurs, from the operation information about the mining machine travelling the route corresponding to the index concerning improvement of the travel speed to generate a route change index about change of a route of the mining machine or a fatigue check index about an attendance state of a driver of the mining machine, based on the long-time stop information and the long-time stop position information extracted.

11. The management system of the mining machine according to claim 2, wherein, when the operation information is analyzed, the management device extracts payload amount information about an amount of payload of a load loaded by the plurality of the mining machines from the operation information about the plurality of mining machines travelling the same identified route to generate a payload improvement request index requesting improvement of insufficient payload or improvement of over-payload, based on the payload amount information extracted.

12. The management system of the mining machine according to claim 2, wherein, when the operation information is analyzed, the management device extracts a payload amount information about the amount of payload of a load loaded by the plurality of mining machines, fuel consumption information about fuel consumption during travel, and cycle time information about a time required to finish unloading, load a load, and unload the load, from the operation information about the plurality of mining machines travelling the same identified route to generate a driving education index requesting improvement of driving of a driver who drives the mining machine, based on the payload amount information, the fuel consumption information, and the cycle time information extracted.

13. The management system of the mining machine according to claim 6, wherein the management device divides the identified route into a plurality of sections in accordance with a slope of the identified route, and analyzes the operation information about the plurality of mining machines travelling the same identified route, for each of the divided sections.

14. A management method of a mining machine including an in-vehicle information collection device which is provided in a mining machine working in a mine and collects operation information about an operation state of the mining machine; an in-vehicle wireless communication device provided in the mining machine to perform communication; a management-side wireless communication device which communicates with the in-vehicle wireless communication device; and a management device, the management method comprising:

obtaining, by the management device, the operation information via the in-vehicle wireless communication device and the management-side wireless communication device; and identifying, by the management device, a route along which the mining machine travels, based on a comparison between a single piece of position information of an intermediate position in a route along which the mining machine moves from a dumping position to a loading position and a single piece of position information of an intermediate position in a route along which the mining machine moves from the loading position to the dumping position extracted from multiple pieces of position information obtained by compressing the number of pieces of data of multiple pieces of position information at the dumping position, position information about the loading position, and position information between the dumping position and the loadin osition included in a route along which the mining machine moves from a location where the mining machine unloads a load, to a location where the mining machine loads a load, and to a location where the mining machine unloads the load again, included in the operation information, and position information about a designated route set in advance.

15. The management method of the mining machine according to claim 14, wherein
the method includes identifying, by the management device, a pattern of the route along which the mining machine travels based on the number of dumping positions and loading positions and position information at two locations between the dumping position and loading position, and extracting, by the management device, position information at the dumping position, position information about the loading position and position information at the two locations between the dumping position and the loading position as a target position of the comparison according to the identified pattern of the route.

16. The management method of the mining machine according to claim 14, wherein when the route along which the mining machine travels is identified, numerical values of position information at multiple locations included in the route are rounded to compress the number of pieces of data of multiple pieces of position information.

17. The management method of the mining machine according to claim 14, further comprising storing, by the management device, in a management-side storage device, the identified route along which the mining machine travels from which the operation information is collected and the operation information collected in association with each other.

18. The management method of the mining machine according to claim 14, wherein, after the route is identified, the management method includes:
extracting, by the management device, road surface information about a bump on a road surface from the operation information about a plurality of the mining machines travelling the same identified route, and
generating, by the management device, an index concerning maintenance of the road surface based on the extracted road surface information.

19. The management method of the mining machine according to claim 14, wherein, after the route is identified, the management method includes:
extracting, by the management device, fuel consumption information about fuel consumption during travel from the operation information about a plurality of the mining machines travelling the same identified route, and
generating, by the management device, an index concerning the fuel consumption based on the extracted fuel consumption information.

20. The management method of the mining machine according to claim 14, wherein, after the route is identified, the management method includes:
extracting, by the management device, a travel time and a stop time from the operation information about a plurality of the mining machines travelling the same identified route, and
generating, by the management device, an index concerning improvement of a travel speed of the mining machine, based on the travel time and the stop time extracted.

21. The management method of the mining machine according to claim 20, wherein, after the route is identified, the management method includes:
extracting, by the management device, long-time stop information about stop for a predetermined time or more and abnormality information about abnormality of the plurality of mining machines, from the operation information about a plurality of the mining machines travelling the route corresponding to the index concerning improvement of the travel speed, and
generating, by the management device, an index about inspection of the mining machine, based on the long-time stop information and the abnormality information extracted.

22. The management method of the mining machine according to claim 20, wherein, after the route is identified, the management method includes:
further extracting, by the management device, long-time stop position information about a position where stop for the predetermined time or more occurs, from the operation information about the mining machine travelling the route corresponding to the index concerning improvement of the travel speed, and
generating, by the management device, a route change index about change of a route of the mining machine or a fatigue check index about an attendance state of a driver of the mining machine, based on the long-time stop information and the long-time stop position information extracted.

23. The management method of the mining machine according to claim 14, wherein, after the route is identified, the management method includes:
extracting, by the management device, payload amount information about an amount of payload of a load loaded by the plurality of mining machines from the operation information about the plurality of mining machines travelling the same identified route, and
generating, by the management device, a payload improvement request index requesting improvement of insufficient payload or improvement of over-payload, based on the payload amount information extracted.

24. The management method of the mining machine according to claim 14, wherein, after the route is identified, the management method includes:
extracting, by the management device, a payload amount information about the amount of payload of a load loaded by the plurality of mining machines, fuel consumption information about fuel consumption during travel, and cycle time information about a time required to finish unloading, load a load, and unload the load, from the operation information about the plurality of mining machines travelling the same identified route, and
generating, by the management device, a driving education index requesting improvement of driving of a driver who drives the mining machine, based on the payload amount information, the fuel consumption information, and the cycle time information thus extracted.

25. The management method of the mining machine according to claim 18, wherein, after the route is identified, the management method includes:
dividing, by the management device, the identified route into a plurality of sections in accordance with a slope of the identified route, and
analyzing, by the management device, the operation information about the plurality of mining machines travelling the same identified route, for each of the divided sections.

26. The management system of the mining machine according to claim 7, wherein the management device divides the identified route into a plurality of sections in accordance with a slope of the identified route, and analyzes the operation information about the plurality of mining machines travelling the same identified route, for each of the divided sections.

27. The management system of the mining machine according to claim 8, wherein the management device divides the identified route into a plurality of sections in accordance with a slope of the identified route, and analyzes the operation information about the plurality of mining machines travelling the same identified route, for each of the divided sections.

28. The management system of the mining machine according to claim 11, wherein the management device divides the identified route into a plurality of sections in accordance with a slope of the identified route, and analyzes the operation information about the plurality of mining machines travelling the same identified route, for each of the divided sections.

29. The management system of the mining machine according to claim 12, wherein the management device divides the identified route into a plurality of sections in accordance with a slope of the identified route, and analyzes the operation information about the plurality of mining machines travelling the same identified route, for each of the divided sections.

30. The management method of the mining machine according to claim 19, wherein, after the route is identified, the management method includes:
  dividing, by the management device, the identified route into a plurality of sections in accordance with a slope of the identified route, and
  analyzing, by the management device, the operation information about the plurality of mining machines travelling the same identified route, for each of the divided sections.

31. The management method of the mining machine according to claim 20, wherein, after the route is identified, the management method includes:
  dividing, by the management device, the identified route into a plurality of sections in accordance with a slope of the identified route, and
  analyzing, by the management device, the operation information about the plurality of mining machines travelling the same identified route, for each of the divided sections.

32. The management method of the mining machine according to claim 23, wherein, after the route is identified, the management method includes:
  dividing, by the management device, the identified route into a plurality of sections in accordance with a slope of the identified route, and
  analyzing, by the management device, the operation information about the plurality of mining machines travelling the same identified route, for each of the divided sections.

33. The management method of the mining machine according to claim 24, wherein, after the route is identified, the management method includes:
  dividing, by the management device, the identified route into a plurality of sections in accordance with a slope of the identified route, and
  analyzing, by the management device, the operation information about the plurality of mining machines travelling the same identified route, for each of the divided sections.

34. The management system of the mining machine according to claim 1, wherein a pattern of the route along which the mining machine travels is identified based on the number of dumping positions and loading positions, and position information at two locations between the dumping position and the loading position, and position information at the dumping position, position information about the loading position and position information at the two locations between the dumping position and the loading position is extracted as a target position of the comparison according to the identified pattern of the route.

35. The management system of the mining machine according to claim 1, wherein when the route along which the mining machine travels is identified, numerical values of position information at multiple locations included in the route are rounded to compress the number of pieces of data of multiple pieces of position information.

36. The management system of the mining machine according to claim 1, further comprising a management-side storage device which stores the identified route along which the mining machine travels from which the operation information is collected and the operation information collected in association with each other.

37. The management system of the mining machine according to claim 1, wherein, when the operation information is analyzed, the management device extracts road surface information about a bump on a road surface from the operation information about a plurality of the mining machines travelling the same identified route to generate an index concerning maintenance of the road surface based on the extracted road surface information.

38. The management system of the mining machine according to claim 1, wherein, when the operation information is analyzed, the management device extracts fuel consumption information about fuel consumption during travel from the operation information about a plurality of the mining machines travelling the same identified route to generate an index concerning the fuel consumption based on the extracted fuel consumption information.

39. The management system of the mining machine according to claim 1, wherein, when the operation information is analyzed, the management device extracts a travel time and a stop time from the operation information about a plurality of the mining machines travelling the same identified route to generate an index concerning improvement of a travel speed of the mining machine, based on the travel time and the stop time extracted.

40. The management system of the mining machine according to claim 39, wherein, when the operation information is analyzed, the management device extracts long-time stop information about stop for a predetermined time or more and abnormality information about abnormality of the plurality of mining machines, from the operation information about a plurality of the mining machines travelling the route corresponding to the index concerning improvement of the travel speed to generate an index about inspection of the mining machine, based on the long-time stop information and the abnormality information extracted.

41. The management system of the mining machine according to claim 39, wherein, when the operation information is analyzed, the management device further extracts long-time stop position information about a position where stop for the predetermined time or more occurs, from the operation information about the mining machine travelling the route corresponding to the index concerning improvement of the travel speed to generate a route change index about change of a route of the mining machine or a fatigue check index about an attendance state of a driver of the mining machine, based on the long-time stop information and the long-time stop position information extracted.

42. The management system of the mining machine according to claim 1, wherein, when the operation information is analyzed, the management device extracts payload amount information about an amount of payload of a load loaded by the plurality of the mining machines from the operation information about the plurality of mining machines travelling the same identified route to generate a payload improvement request index requesting improvement of insufficient payload or improvement of over-payload, based on the payload amount information extracted.

43. The management system of the mining machine according to claim 1, wherein, when the operation information is analyzed, the management device extracts a payload amount information about the amount of payload of a load loaded by the plurality of mining machines, fuel consumption information about fuel consumption during travel, and cycle time information about a time required to finish unloading, load a load, and unload the load, from the operation information about the plurality of mining machines travelling the same identified route to generate a driving education index requesting improvement of driving of a driver who drives the mining machine, based on the payload amount information, the fuel consumption information, and the cycle time information extracted.

44. The management system of the mining machine according to claim 37, wherein the management device divides the identified route into a plurality of sections in accordance with a slope of the identified route, and analyzes the operation information about the plurality of mining machines travelling the same identified route, for each of the divided sections.

45. The management system of the mining machine according to claim 38, wherein the management device divides the identified route into a plurality of sections in accordance with a slope of the identified route, and analyzes the operation information about the plurality of mining machines travelling the same identified route, for each of the divided sections.

46. The management system of the mining machine according to claim 39, wherein the management device divides the identified route into a plurality of sections in accordance with a slope of the identified route, and analyzes the operation information about the plurality of mining machines travelling the same identified route, for each of the divided sections.

47. The management system of the mining machine according to claim 42, wherein the management device divides the identified route into a plurality of sections in accordance with a slope of the identified route, and analyzes the operation information about the plurality of mining machines travelling the same identified route, for each of the divided sections.

48. The management system of the mining machine according to claim 43, wherein the management device divides the identified route into a plurality of sections in accordance with a slope of the identified route, and analyzes the operation information about the plurality of mining machines travelling the same identified route, for each of the divided sections.

* * * * *